US012654600B2

(12) United States Patent
Zhang et al.

(10) Patent No.: US 12,654,600 B2
(45) Date of Patent: Jun. 16, 2026

(54) SEAT ASSEMBLY

(71) Applicant: Lear Corporation, Southfield, MI (US)

(72) Inventors: Li Zhang, Shanghai (CN); Xia Li, Shanghai (CN)

(73) Assignee: Lear Corporation, Southfield, MI (US)

( * ) Notice: Subject to any disclaimer, the term of this patent is extended or adjusted under 35 U.S.C. 154(b) by 207 days.

(21) Appl. No.: 18/394,996

(22) Filed: Dec. 22, 2023

(65) Prior Publication Data

US 2024/0217397 A1 Jul. 4, 2024

(30) Foreign Application Priority Data

Dec. 30, 2022 (CN) .......................... 202211732268.5

(51) Int. Cl.
*B60N 2/22* (2006.01)
*B60N 2/02* (2006.01)
*B60N 2/10* (2006.01)

(52) U.S. Cl.
CPC ....... *B60N 2/2213* (2013.01); *B60N 2/02253* (2023.08); *B60N 2/02258* (2023.08); *B60N 2/10* (2013.01)

(58) Field of Classification Search
CPC .... B60N 2/2213; B60N 2/10; B60N 2/02253; B60N 2/02258; B60N 2/02246; A47C 1/03211
USPC .................................. 297/316, 325, 326, 327
See application file for complete search history.

(56) References Cited

U.S. PATENT DOCUMENTS

| | | | | |
|---|---|---|---|---|
| 4,456,297 A | * | 6/1984 | Pietschmann | .......... A61G 15/02 297/316 |
| 4,752,100 A | * | 6/1988 | Lemaire | ................... A61G 5/14 297/DIG. 10 |
| 6,474,737 B1 | * | 11/2002 | Canteleux | ............ B60N 2/0292 297/378.12 |
| 10,343,557 B2 | | 7/2019 | Akaike | |
| 11,214,180 B1 | | 1/2022 | Targhi | |
| 2014/0159457 A1 | * | 6/2014 | Jaranson | ............ B60N 2/02246 297/362.11 |
| 2017/0059001 A1 | * | 3/2017 | Napau | .................. B60N 2/1864 |

FOREIGN PATENT DOCUMENTS

| | | |
|---|---|---|
| DE | 102016219045 A1 | 4/2017 |
| JP | 2022026369 A | 2/2022 |
| WO | 2018069433 A1 | 4/2018 |

OTHER PUBLICATIONS

German Office Action, DE 10 2023 136 615.7, dated May 26, 2025 (w_translation).

* cited by examiner

*Primary Examiner* — Milton Nelson, Jr.
(74) *Attorney, Agent, or Firm* — Reising Ethington P.C.

(57) ABSTRACT
A seat assembly includes a seat base, a seat bottom connected to the seat base, a seat back pivotably connected to the seat base, and/or an adjustment assembly connected to the seat base. The adjustment assembly may include a first lever connected to the seat back, a second lever pivotably connected to the seat base and the seat back, and/or a motor coupled to the first lever. Actuation of the motor may rotate the first lever to adjust the seat back to a first seat position and to a second seat position relative to the seat base.

18 Claims, 20 Drawing Sheets

SEAT ASSEMBLY

CROSS-REFERENCE TO RELATED APPLICATION

This application claims priority to Chinese Patent Application No. CN 2022117322685, filed on Dec. 30, 2022, the contents of which is hereby incorporated by reference in its entirety.

TECHNICAL FIELD

The present disclosure generally relates to a seat assembly, including seat assemblies that may include an adjustable portion of a seat bottom and a seatback, and/or may be used in connection with vehicles.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and embodiments are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
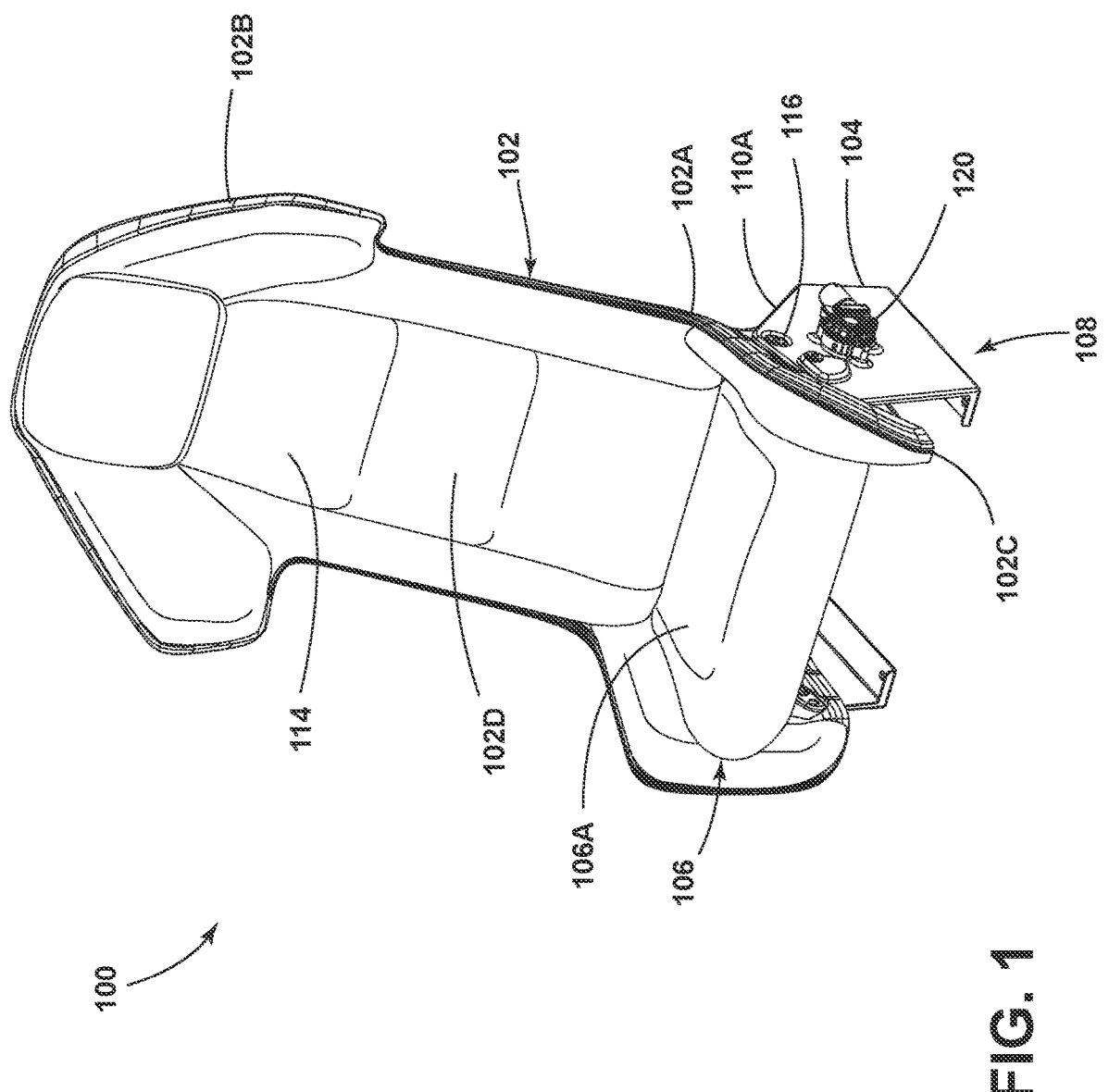
FIG. 1 is a perspective view generally illustrating an embodiment of a seat assembly according to teachings of the present disclosure.
Figure 5:
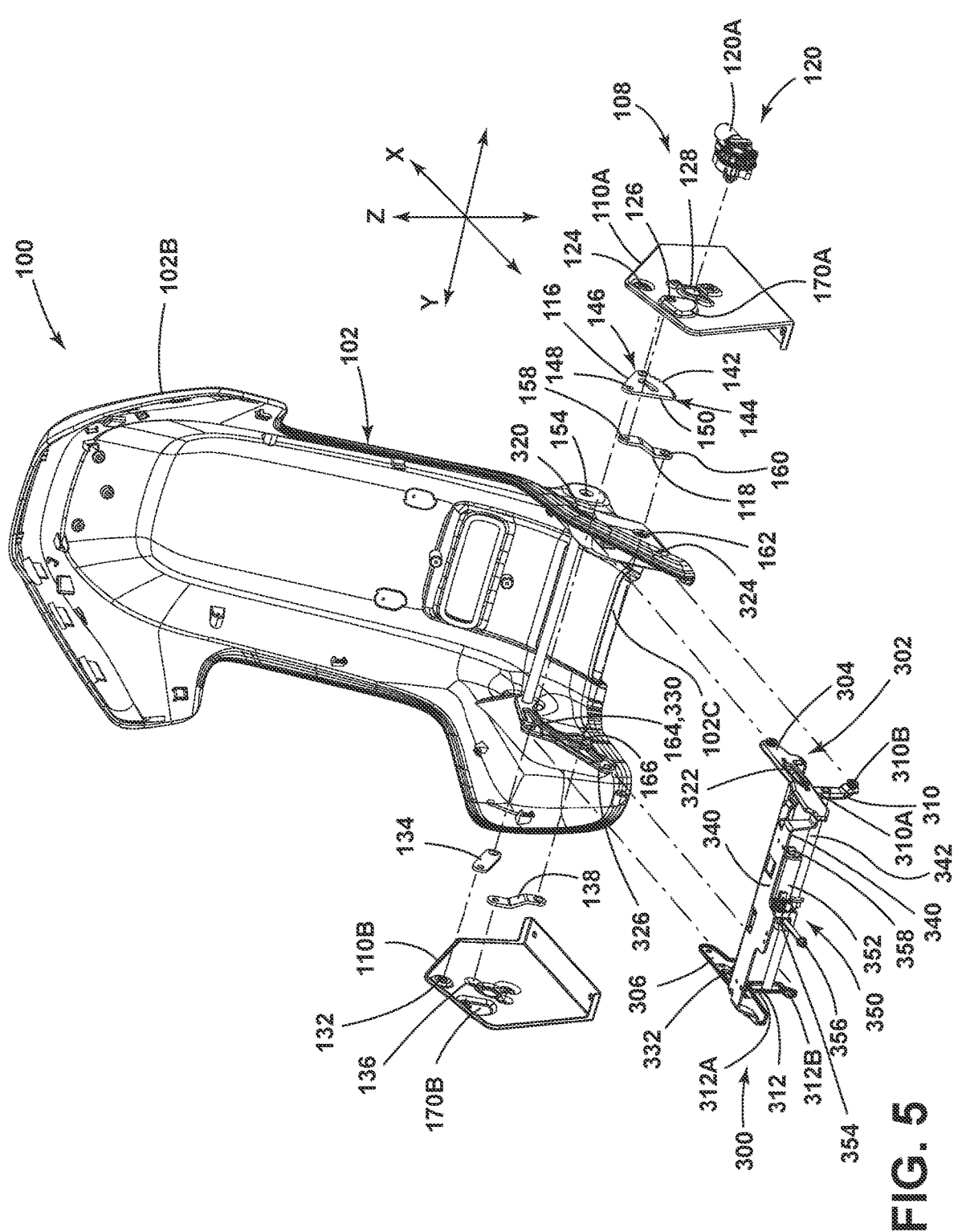
FIG. 5 is an exploded view generally illustrating an embodiment of a seat assembly according to teachings of the present disclosure.

Referring to FIGS. 1 and 5, embodiments of a seat assembly 100 with a reclining seat back 102 are depicted. The seat assembly 100 is configured for use with a vehicle. However, the seat assembly 100 can be utilized in other situations, with other apparatuses, and/or for other applications. The seat assembly 100 is light, compact, and produces a low amount of noise and vibration during operation. The seat assembly 100 comprises relatively few components for simple and lower cost assembly. The seat assembly 100 reclines about an axis of rotation 708 that is at or below a height of a hip point 706 of an occupant 700 (e.g., in a vertical/Z-direction), and/or that is generally aligned with the hip point 706 in a longitudinal/X-direction (see, e.g., FIGS. 7A and 7B), which may provide a more stable and/or comfortable position for the an occupant, which may reduce spinal pressure relative to other designs. In some configurations, the axis of rotation 708 of the seat assembly 100 may be aligned directly (e.g., zero distance) or within a small X-direction distance of the hip point 706. The distance may, for example and without limitation, be about 10 mm or less.

Referring to FIGS. 1-4D the seat assembly 100 includes a seat back 102, a seat base 104, a seat bottom 106, and an adjustment assembly 108. The seat base 104 includes one or more brackets 110A, 110B that supports the seat assembly 100 and connects the seat assembly 100 to a mounting surface, such as a vehicle body or frame. The seat bottom 106 includes a top surface 106A upon which a user sits when occupying the seat assembly 100 and is connected to the seat base 104. The seat back 102 includes a front surface 114 of a cushion 102D upon which the user leans against when occupying the seat assembly 100. The seat back 102 includes a seat back frame 102A. The seat back frame includes an upper portion 102B and a lower portion 102C, the lower portion 102C extending at least partially underneath and/or along one or both sides of the seat bottom 106. For example, the seat bottom and the lower portion 102C may overlap in the Z-direction and/or the Y-direction (e.g., vertical and/or lateral/transverse directions). A length of the overlap (e.g., generally in the X-direction) may, in some instances, be at least 25% (e.g., 25%, 40%, 50%, other values) of the length of the seat bottom 106 in the X-direction. The seat back 102 is pivotably connected to the seat base 104 to adjust the position of the seat back 102 with respect to the seat base 104 and/or brackets 110A, 110B thereof.

The adjustment assembly 108 is connected to the seat base 104 and includes a first lever 116 and a second lever 118. The first lever 116 is connected to the seat back 102, and the second lever 118 is pivotably connected to the seat base 104 and the seat back 102. The first lever 116 includes a sector gear. The second lever 118 may be linear and/or include a stepped configuration. A stepped configuration may include two parallel planar portions offset in the Y-direction and a radial direction, and connected by an angled and/or curved portion. The planar portions may be generally parallel to an X-Z plane. The adjustment assembly 108 includes a motor 120 engaged/coupled with the first lever 116, such that actuation of the motor 120 rotates the first lever 116 to adjust the seat back 102 to and/or between a first position 200 (see, e.g., FIGS. 3A and 4A) and to a second position 202 (see, e.g., FIGS. 3B and 4B). In some configurations, the adjustment assembly 108 does not include a second motor for rotating the seat back 102 or any recliners (or a synchronization lever/shaft for synchronizing the recliners), which may reduce the weight, complexity, or cost of the assembly compared to other designs.

Figure 2:
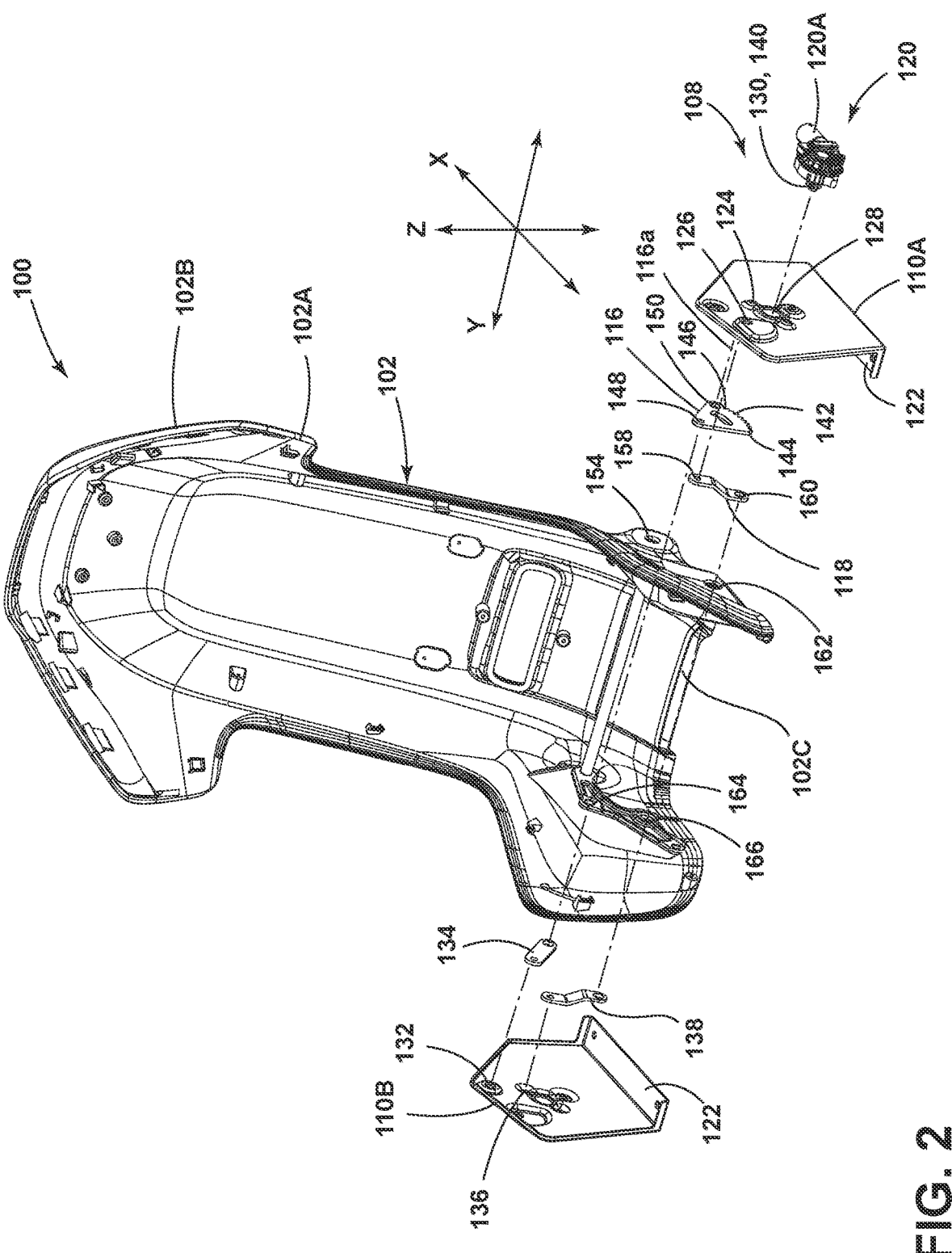
FIG. 2 is an exploded view generally illustrating an embodiment of a seat assembly according to teachings of the present disclosure.
Figures 4A, 4B:
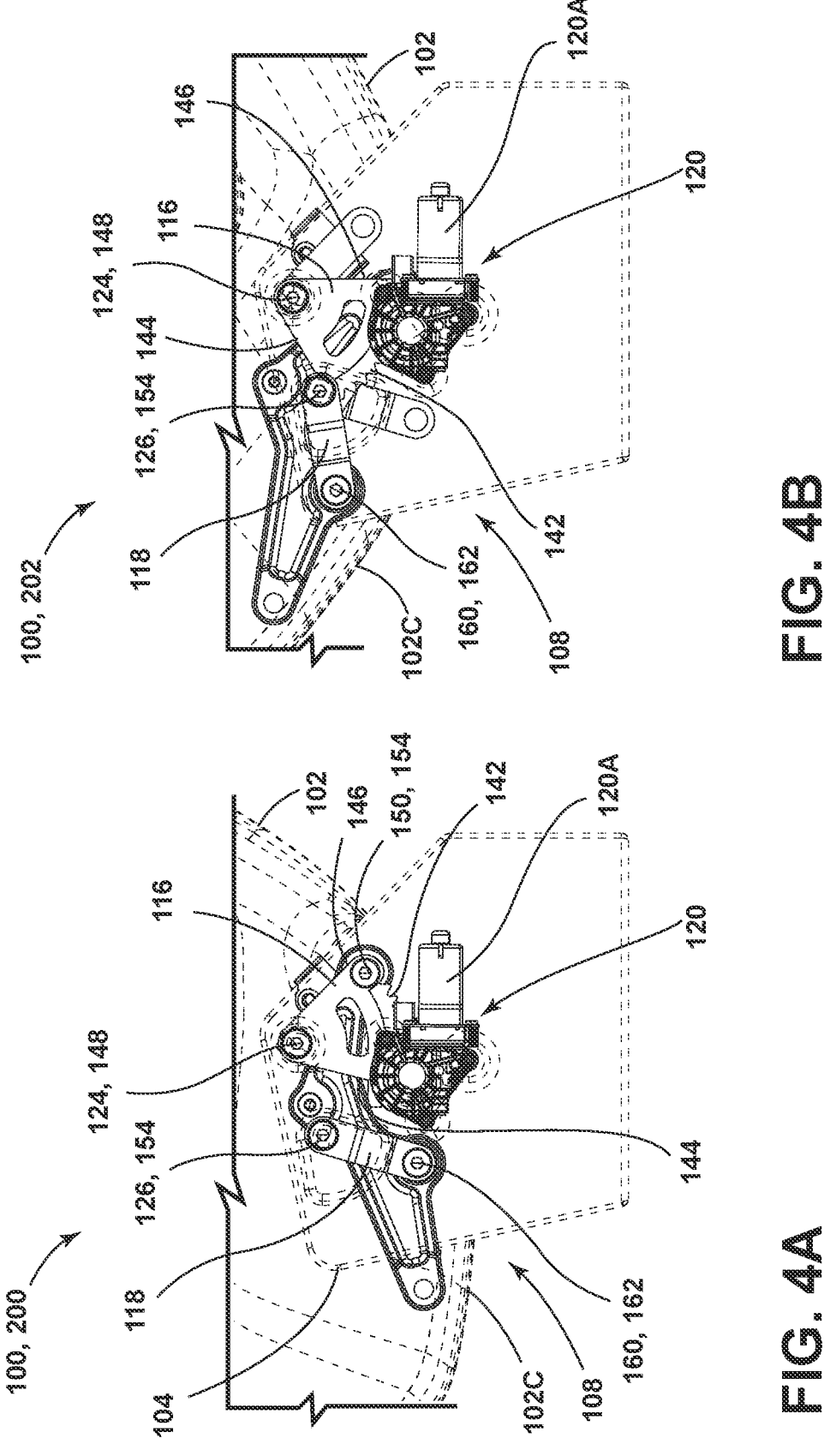
FIGS. 4A and 4B are side views generally illustrating portions of an embodiment of a seat assembly in a first position and a second position, respectively, according to teachings of the present disclosure.

Referring to FIGS. 2, 4A and 4B, the seat base 104 includes a first bracket 110A and a second bracket 110B. The first bracket 110A and the second bracket 110B are disposed at opposite sides of the seat base 104 (e.g., spaced in the Y-direction). The brackets 110A, 110B include a bottom surface 122 which is generally flat for connecting the seat assembly 100 to a mounting surface, such as of a vehicle. The first bracket 110A includes a first lever bracket connection 124 that pivotably connects the first lever 116 to the first bracket 110A. The first bracket 110A also includes a second lever bracket connection 126 that pivotably connects the second lever 118 to the first bracket 110A. The second lever bracket connection 126 may be disposed in a recessed portion 170A of the first bracket 110A. A portion of the second lever 118 may be disposed in the recessed portion 170A and the second lever 118 may extend out from the recessed portion 170A. The second bracket 110B may include a corresponding recessed portion 170B for the fourth lever 138. The first bracket 110A includes an aperture 128 for receiving a shaft 130 of the motor 120 (see, e.g., FIG. 2). The second bracket 110B includes a third lever bracket connection 132 that pivotably connects a third lever 134 to the second bracket 110B. The second bracket 110B also includes a fourth lever bracket connection 136 that pivotably connects a fourth lever 138 to the second bracket 110B. The third lever 134 and the fourth lever 138 are pivotably connected to the seat back 102 at a third lever seat connection 164 and a fourth lever seat connection 166, respectively.

FIGS. 2, 4A and 4B show an adjustment assembly 108 connected to the seat base 104 for adjusting the seat back 102 relative to the seat base 104. The adjustment assembly 108 includes the first lever 116, the second lever 118, and the motor 120. The motor 120 may include body 120A, a shaft 130, and/or a gear 140 (e.g., a pinion gear) connected to the shaft 130. The first lever 116 may be configured as a sector gear and/or include a plurality of teeth 142 that engage with a gear teeth of the motor 120 and/or the shaft 130. In some configurations, the plurality of teeth 142 are disposed at an outer circumference of the first lever 116, and may extend generally downward. The shaft 130 of the motor 120 extends through the aperture 128 of the first bracket 110A and engages with the plurality of teeth 142 of the first lever 116 and/or a gear 140 connected thereto. For example, the shaft 130 may include teeth and/or may be connected to a pinion gear 140 having teeth that engage the teeth 142 of the first lever 116. As the motor 120 rotates the shaft 130 and/or the gear 140, the shaft 130 and/or the gear 140 drives the first lever 116 such that the first lever 116 moves/pivots from a position in which the a first circumferential end 144 of the first lever 116 is engaged with the shaft 130 to or toward a second position in which a second circumferential end 146 of the first lever 116 is engaged with shaft 130. In some configurations, the shaft 130 extends through the aperture 128 such that a body 120A of the motor 120 is disposed at an outer side of the seat base 104 (e.g., bracket 110A) and the gear 140 is connected to the shaft 130 at an inner side of the seat base 104. The motor 120 may be connected (e.g., mounted) to the outer side of the bracket 110A at or about a bottom of the bracket 110A, which may maximize the distance of the motor from the cars of an occupant 700, which may reduce the noise of the motor 120 heard by the occupant 700. For example and without limitation, the motor 120 may be at least 800 mm away from the expected position of an occupant's ears and/or a headrest 704. Additionally or alternatively, connecting the motor 120 to the bracket 110A, such as at or about the bottom of the bracket 110A and/or below a bottom of the seat back cushion 102D, may allow for thinner/slimmer configurations of the seat back 102, such as compared to other designs with motors and/or recliners mounted in higher positions, such as at or about lower portions of a seat back cushion.

The first lever 116 includes a top section 148 opposite the plurality of teeth 142. The top section 148 of the first lever 116 is rotatably connected to the first bracket 110A at a first lever bracket connection 124, which define an axis 116A about which the first lever 116 pivots with respect to the first bracket 110A. The first lever 116 includes a bottom section 150 (e.g., an outer radial section) adjacent to or including the plurality of teeth 142. The bottom section 150 may be connected to the seat back 102 at a first lever seat connection 154 to connect the first lever 116 to the seat back 102. The first lever seat connection 154 may be positioned in a bottommost rearward region of the seat back 102. The first lever 116 and the seat back frame 102A are connected to each other at the first lever seat connection 154 such that the first lever 116 directly causes rotation of the seat back frame 102A. In some configurations, the first lever seat connection 154 moves with the bottom section 150 of the first lever 116.

The adjustment assembly 108 includes a second lever 118 that is pivotably connected to the seat base 104 and the seat back 102 (e.g., the seat back frame 102A). The second lever 118 includes a first end 158 pivotably connected to the first bracket 110A of the seat base 104 at a second lever bracket connection 126. The second lever 118 includes a second end 160 pivotably connected to the seat back frame 102A at a second lever seat connection 162. The first bracket 110A, the first lever 116, the second lever 118, and the seat back frame 102A may function as a four-bar linkage, which may include the first lever 116 moving with actuation of the motor 120, the seat back 102 being driven by the first lever 116 at the first lever seat connection 154, the seat back 102 acting as a coupler to the second lever 118, and/or the second lever 118 acting as a follower as the second lever 118 is pivotably connected to the seat back 102 at the second lever seat connection 162, causing the second lever 118 to pivot with the first lever 116 and the seat back 102. In some configurations, the seat back frame 102A is not directly connected to the bracket 110A of the seat base and is instead indirectly connected via the first lever 116 and the second lever 118.

Figure 3A:
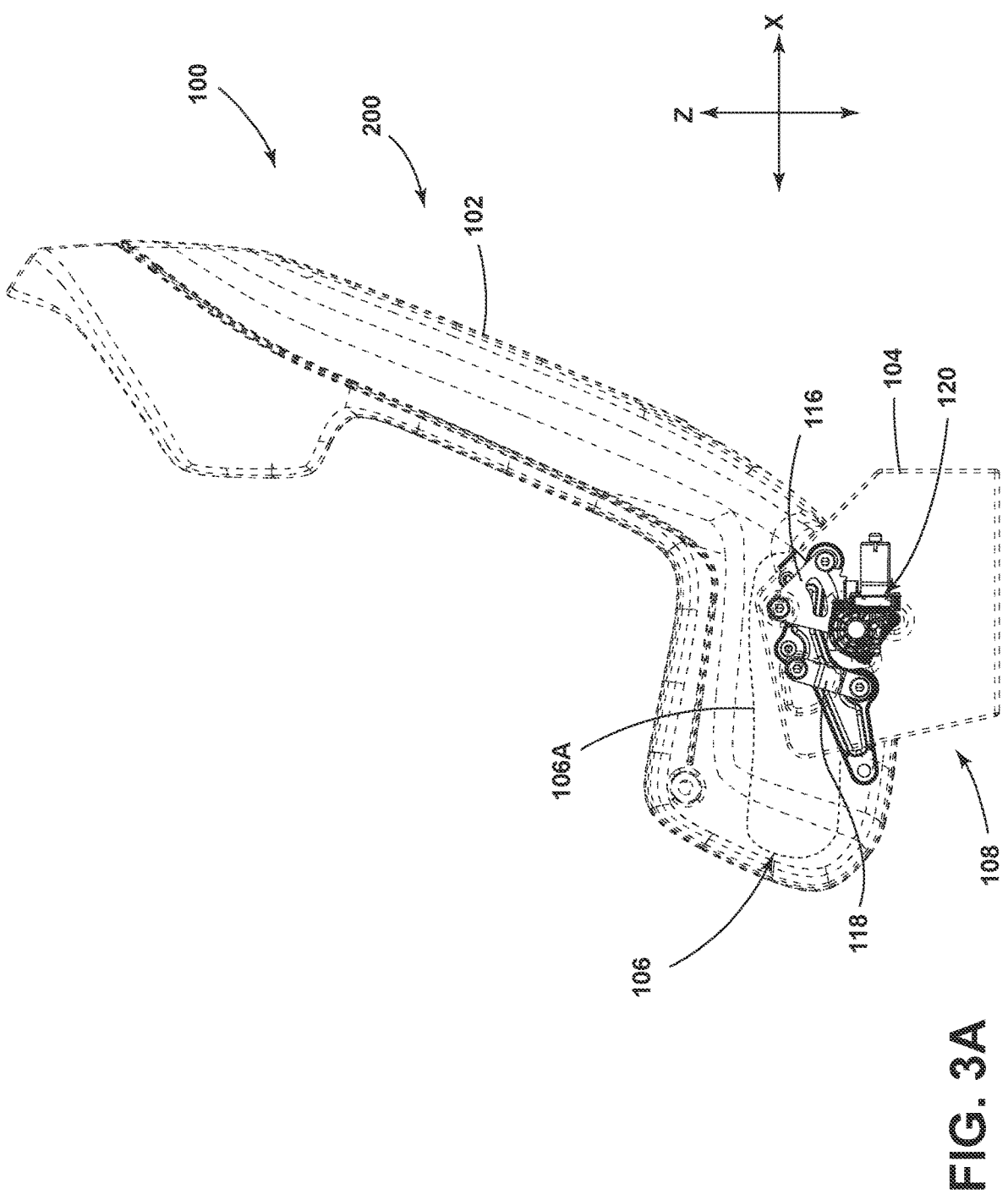
FIGS. 3A and 3B are side views generally illustrating an embodiment of a seat assembly in a first position and a second position, respectively, according to teachings of the present disclosure.
Figure 3B:
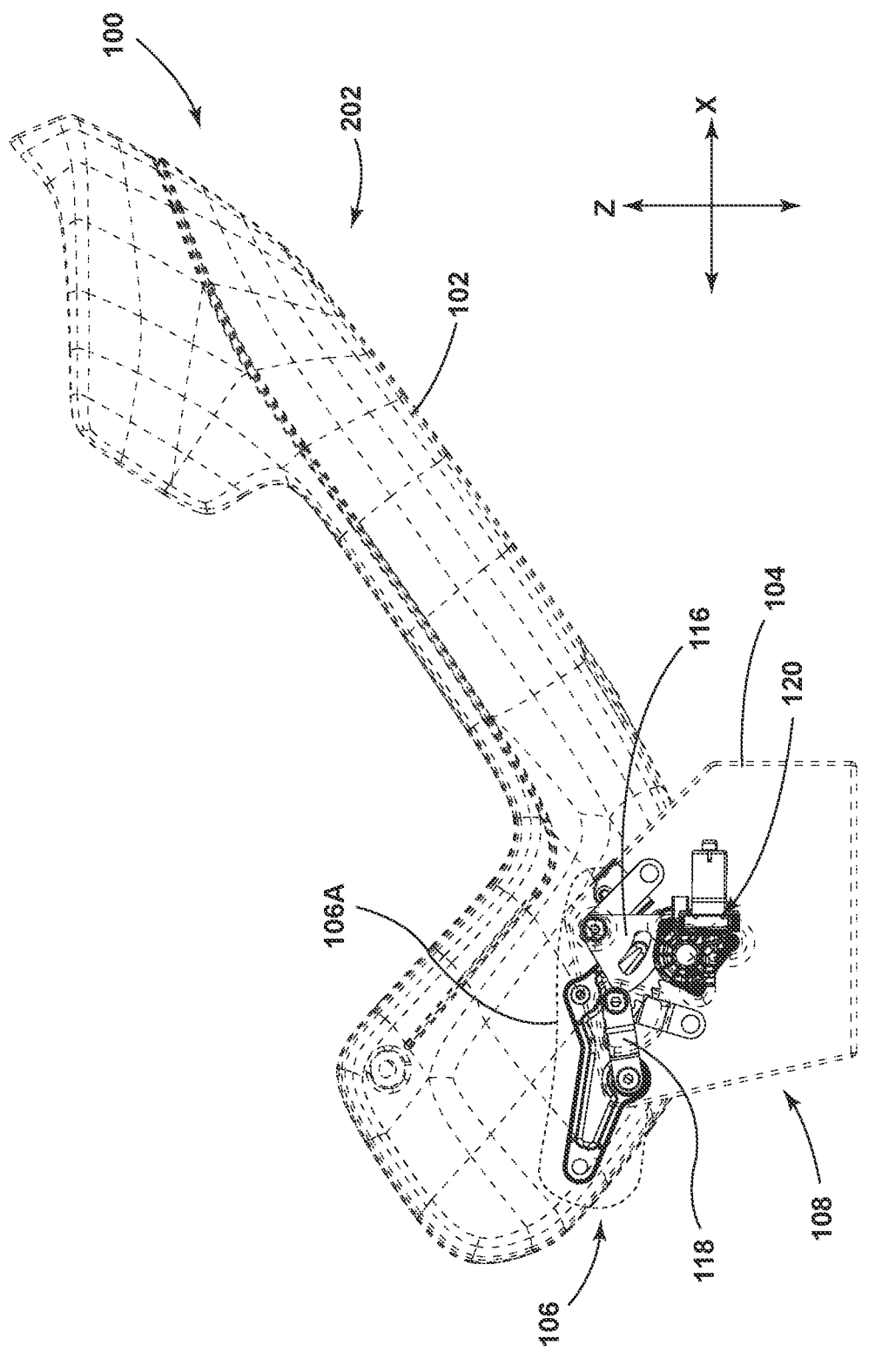

Referring to FIGS. 3A-4D, the motor 120 rotates the first lever 116 to adjust the seat back 102 from a first seat position 200 to a second seat position 202 and/or positions therebetween. As illustrated in FIG. 3A, the first seat position 200 may include a design position where the seat back 102 is primarily upright. Referring to FIGS. 4A and 4C, the first lever 116 and the second lever 118 are illustrated for the first seat position 200. In the first seat position 200, the first lever 116 is positioned such that the shaft 130 of the motor 120 is positioned at the first end 144 of the first lever 116. The second lever 118 is positioned such that the second lever 118 is disposed at a small angle relative to a vertical direction.

Figures 4C, 4D:
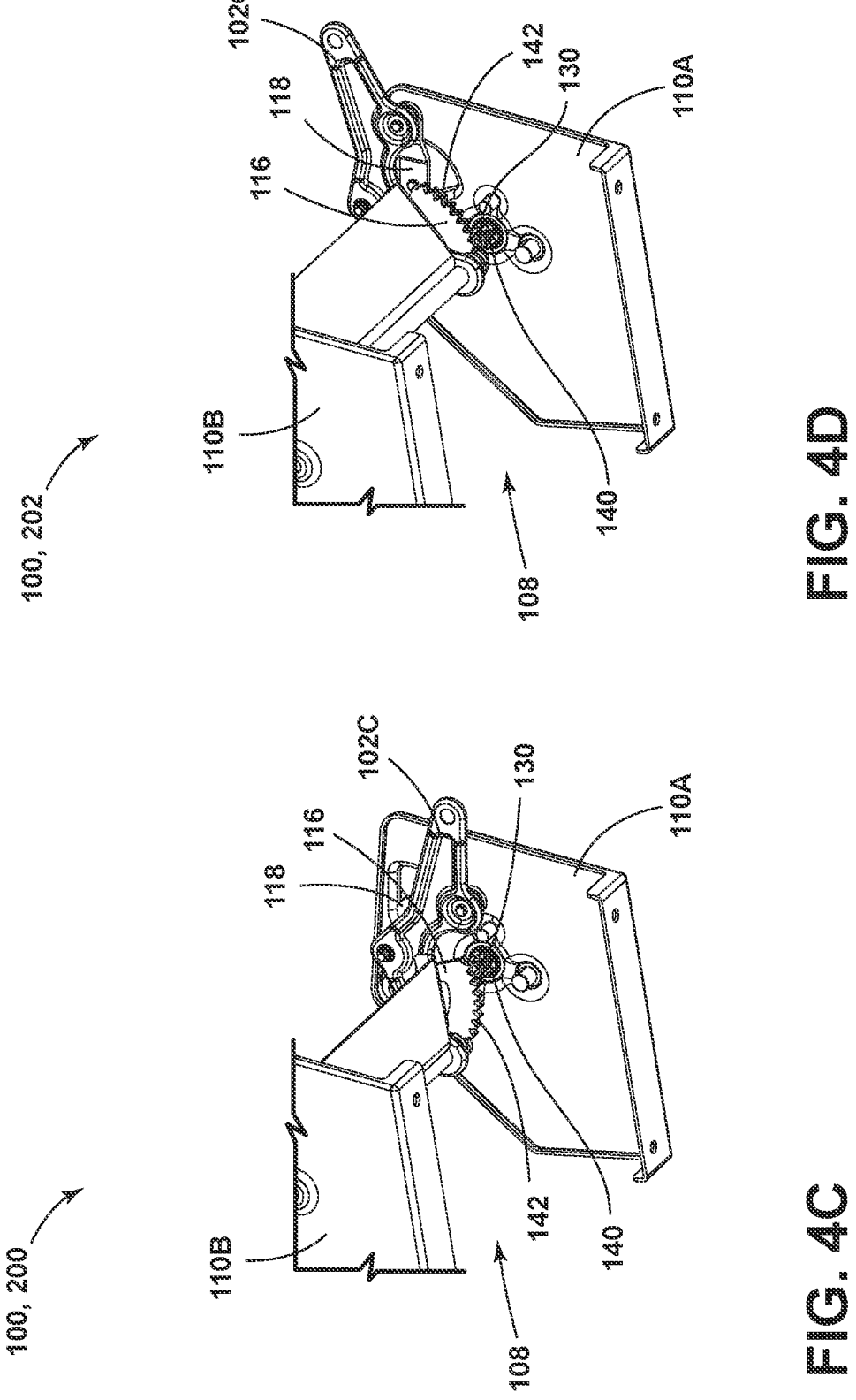
FIGS. 4C and 4D are perspective views generally illustrating portions of an embodiment of a seat assembly in a first position and a second position, respectively, according to teachings of the present disclosure.

Referring to FIGS. 3A-4D, the seat back 102 is adjusted from the first seat position 200 to the second seat position 202 relative to movement of the motor 120 and gear. As illustrated in FIG. 3B, the second seat position 202 includes a reclined position of the seat back 102 (e.g., approximately thirty to thirty-five degrees from the first seat position 200). Referring to FIGS. 4B and 4D, the first lever 116 and the second lever 118 are illustrated for the second seat position 202. In the second seat position 202, the first lever 116 has rotated to a position such that the shaft 130 of the motor 120 is positioned at the second circumferential end 146 of the first lever 116. As the first lever 116 rotates toward the second seat position 202 (e.g., clockwise in FIGS. 3A-4B), the second lever 118 moves relative to the first lever 116 to a generally horizontal position. The second end 160 of the second lever 118 moves in an upward direction at the second lever seat connection 162, raising the seat bottom 106 at the second lever seat connection 162 with the second lever 118.

Referring to FIGS. 5, 6A-6C, and 8A-8D, an adjustment assembly 108 including a seat bottom adjuster 300 is shown. The seat bottom adjuster 300 is connected to the seat bottom 106 to adjust the position of the seat bottom 106 relative to the seat back 102 and/or the seat base 104.

Referring to FIGS. 5 and 8A-8D, a seat bottom adjuster 300 includes a seat bottom frame 302 for pivotably connecting the seat bottom 106 to the seat base 104. The seat bottom frame 302 includes a first seat bottom bracket 304 and a second seat bottom bracket 306. The seat bottom adjuster 300 includes a first seat bottom lever 310 and a second seat bottom lever 312.

The first seat bottom bracket 304 and the second seat bottom bracket 306 are disposed at opposite sides of the seat bottom frame 302 and extend generally parallel to the seat bottom 106 (e.g., in the first position 200, generally in the X-direction).

The first seat bottom bracket 304 is connected to the seat back 102 at a first seat connection 320. The first seat connection 320 may be disposed at or about a top of the lower portion 102C of the seat back frame 102A. The first seat bottom bracket 304 includes an opening 322 for connection with a first end 310A of the first seat bottom lever 310. The opening 322 is elongated (e.g., configured as a slot) to permit translation/sliding of the first end 310A of the first seat bottom lever 310 along/in the opening 322. The second end 310B of the first seat bottom lever 310 is pivotably connected to the seat back 102, such as at or about a front portion 324 of the lower portion 102C of the seat back frame 102A.

The second seat bottom bracket 306 is connected to the seat back 102 at a second seat connection 330. The second seat connection 330 may be disposed at or about a top of the lower portion 102C of the seat back frame 102A at an opposite side from the first seat connection 320. The second seat bottom bracket 306 includes an opening 332 for receiving a first end 312A of a second seat bottom lever 312. The opening 332 is elongated (e.g., configured as a slot) to permit translational/sliding movement of the first end 312A of the second seat bottom lever 312 along/in the opening 332. The second end 312B of the second seat bottom lever 312 is pivotably connected to the seat back 102, such as at or about a front portion 326 of the lower portion 102C of the seat back frame 102A at an opposite side from the first seat bottom lever 310 (see, e.g., FIG. 5).

The first seat bottom bracket 304 and the second seat bottom bracket 306 are connected via a transverse bracket support 340 (e.g., a bracket, a plate, a shaft, a tube, others) that may support the seat bottom 106 and/or assist in keeping the first seat bottom bracket 304 and the second seat bottom bracket 306 level to provide a level top surface 106A of the seat bottom 106. The first seat bottom lever 310 and the second seat bottom lever 312 are connected via a transverse lever support 342 (e.g., a bracket, a plate, a shaft, a tube, others) such that the first seat bottom lever 310 and the second seat bottom lever 312 move together.

In some configurations, the first seat bottom lever 310 of the seat bottom frame 302 additionally acts as a follower as the seat back 102 rotates, driving the second end 310B of the first seat bottom lever 310 to pivot and the first end 310A of the first seat bottom lever 310 to slide rearwards in the opening 322.

In some embodiments, such as generally illustrated in FIG. 5, the seat bottom adjuster 300 includes a motor assembly 350. The motor assembly 350 is connected to the transverse bracket support 340 of the seat bottom frame 302 and to the transverse lever support 342. For example and without limitation, a motor 352 and/or a transmission 354 of the motor assembly 350 may be mounted to and move with the transverse bracket support 340. A threaded rod 356 of the motor assembly 350 may be pivotably connected to a flange 358 fixed to the transverse lever support 342. As the motor 352 rotates, the transmission 354 may engage the threaded rod 356, which may cause the seat bottom levers 310, 312 to move along/in the openings 322, 332, which may result in tilting of the seat bottom 106 relative to the seat back 102 and/or the seat base 104.

Figure 6A:
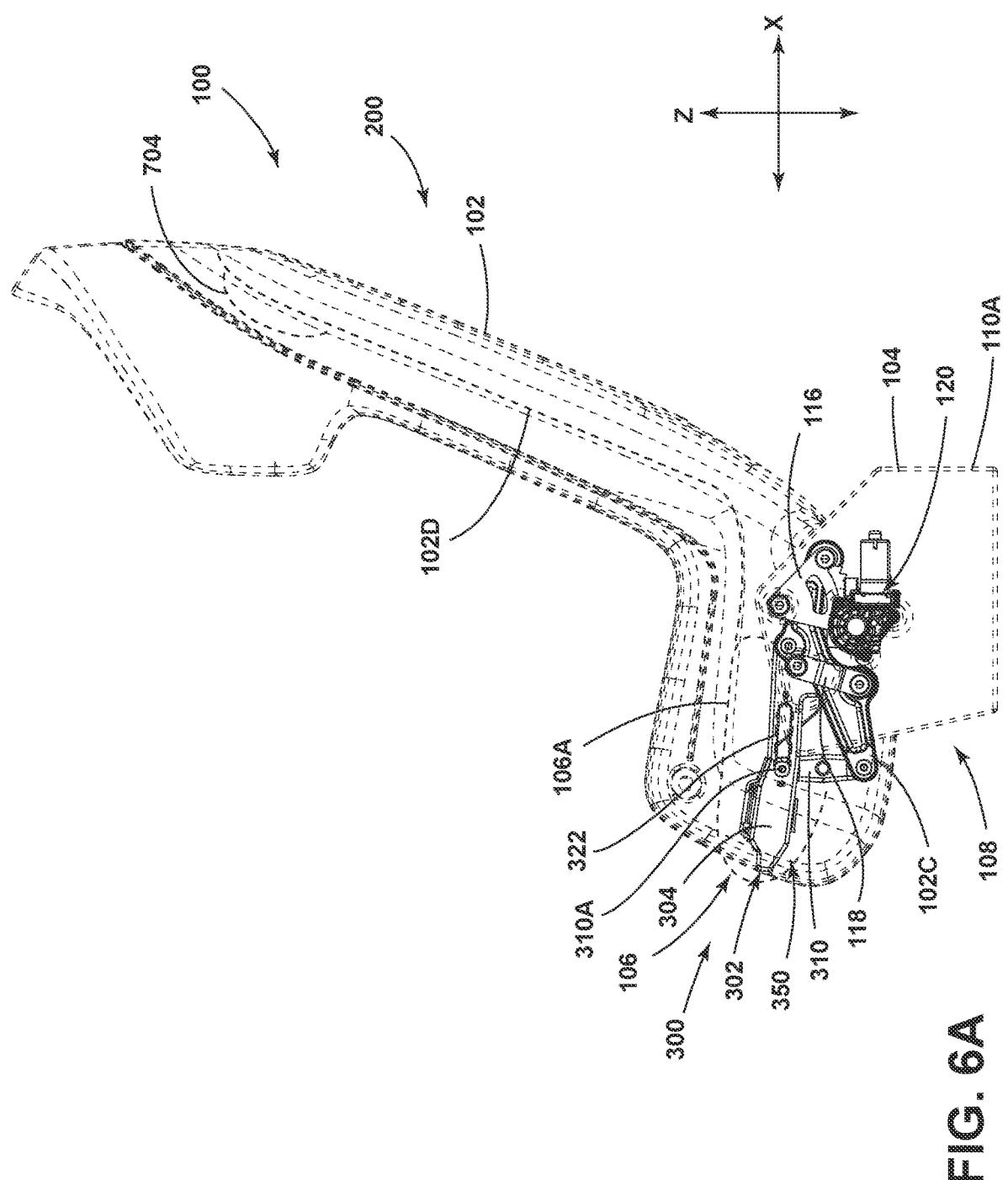
FIGS. 6A and 6B are side views generally illustrating an embodiment of a seat assembly in a first position and a second position, respectively, according to teachings of the present disclosure.
Figure 6B:
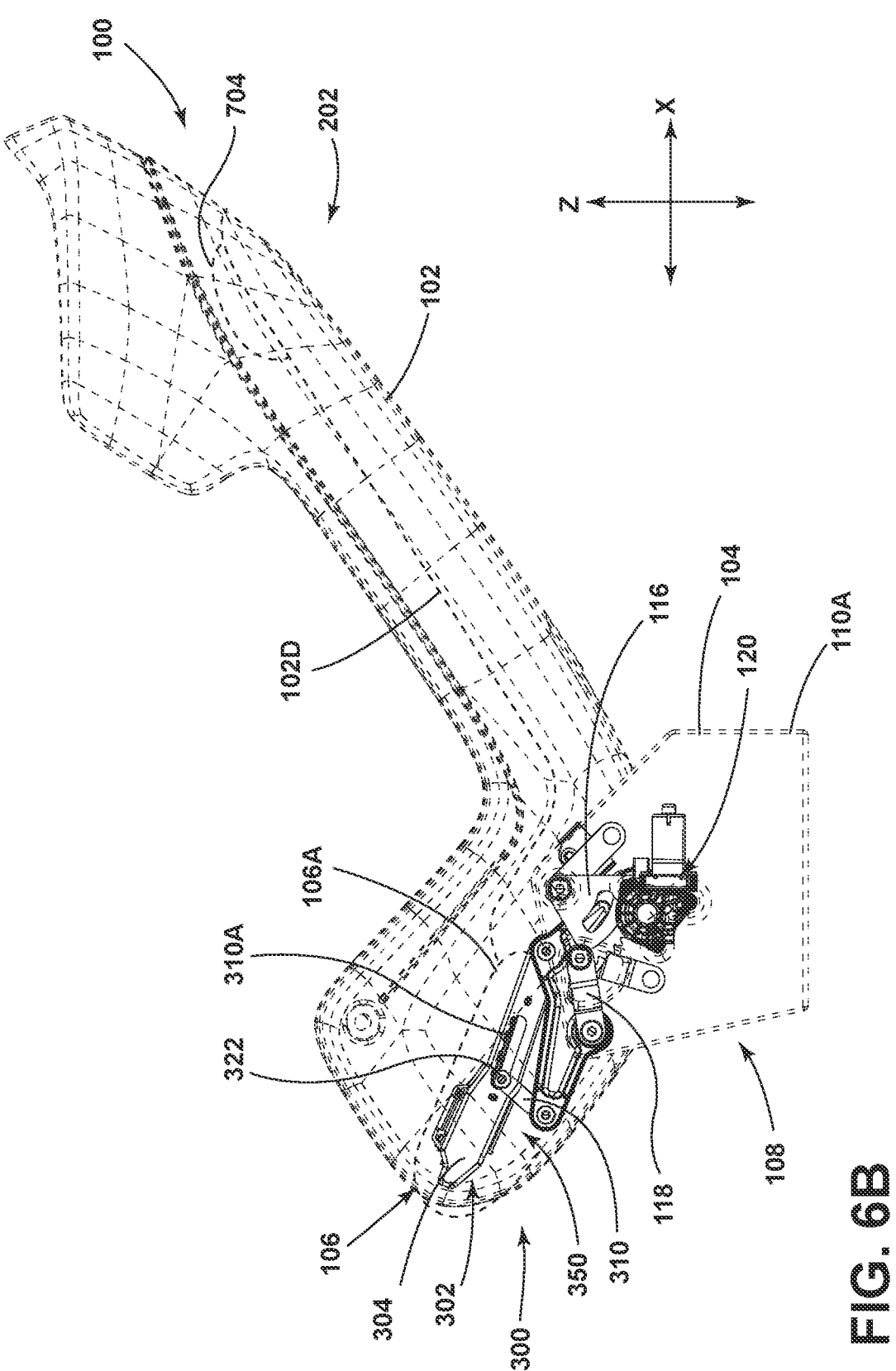

For example, when the motor 352 rotates in a first direction, the motor assembly 350 may move/slide the first ends 310A, 312A of the seat bottom levers 310, 312 toward the rear of the openings 322, 332, which may cause the seat bottom 106 to rotate/tilt forward (e.g., counterclockwise in FIGS. 6A and 6B), and when the motor 352 rotates in a second direction, the motor assembly 350 may move the first ends 310A, 312A toward the front of the openings 322, 332, which may cause the seat bottom 106 to rotate/tilt rearward (e.g., clockwise in FIGS. 6A and 6B). In some configurations, when the motor assembly 350 is not active, the motor assembly 350 effectively locks the positions of the first ends 310A, 312A relative to the openings 322, 332.

Figure 7A:
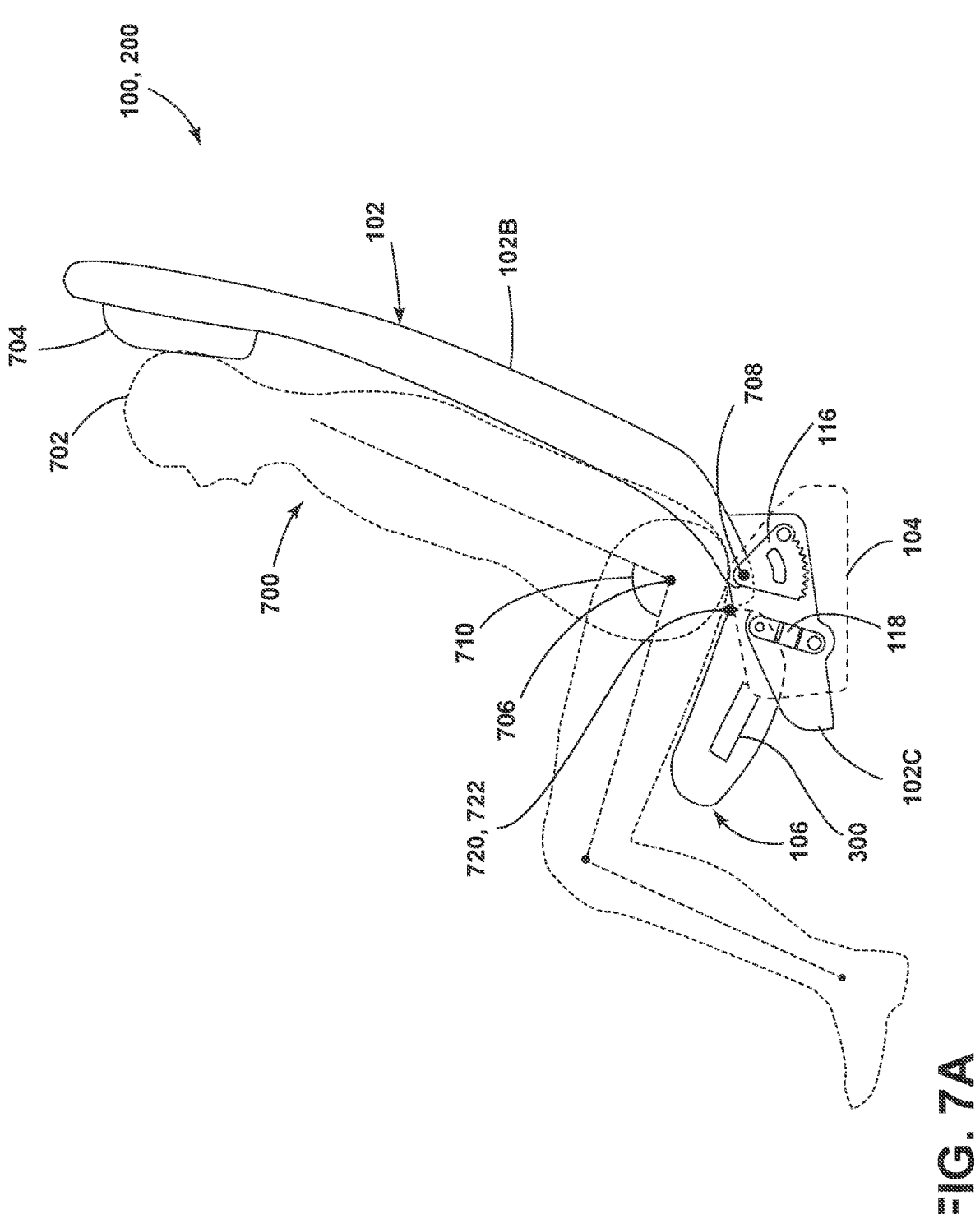
FIGS. 7A and 7B are side views generally illustrating an embodiment of a seat assembly in a first position and a second position, respectively, according to teachings of the present disclosure.

In embodiments, the motor 120 rotates the first lever 116 to adjust the seat back 102 from a first seat position 200 (see, e.g., FIGS. 6A, 7A, 8A, 8C) to or toward a second seat position 202 (see, e.g., FIGS. 6B and 8B) and back to or toward the first seat position 200. As illustrated in FIGS. 6A and 7A, the first seat position 200 is a design position where the seat back 102 is generally upright and the seat bottom

Figures 8A, 8B:
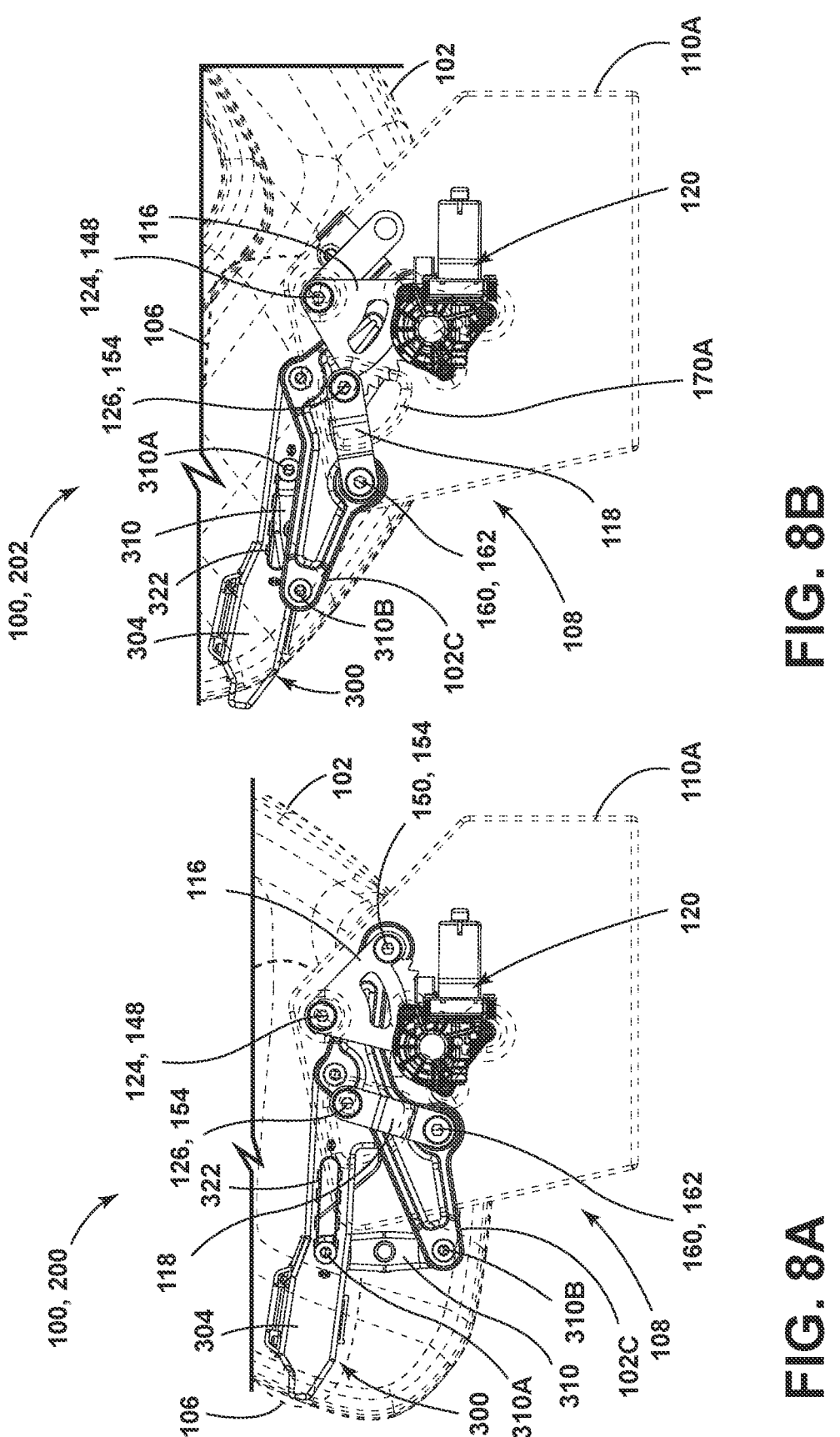
FIGS. 8A and 8B are side views generally illustrating portions of an embodiment of a seat assembly in a first position and a second position according to teachings of the present disclosure.
Figures 8C, 8D:
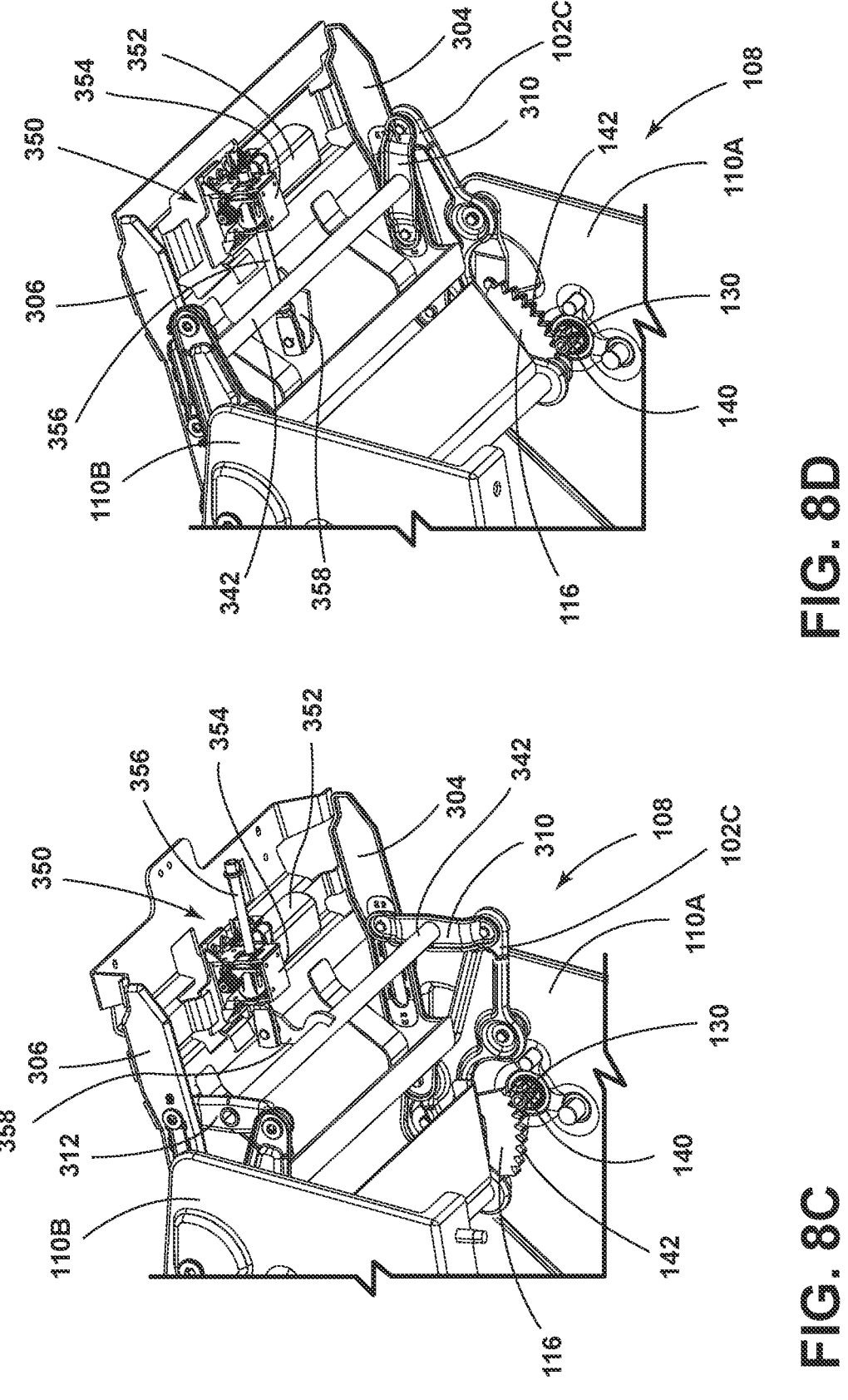
FIGS. 8C and 8D are perspective views generally illustrating portions of an embodiment of a seat assembly in a first position and a second position, respectively, according to teachings of the present disclosure.

106 is generally horizontal. FIGS. 8A and 8C generally illustrate positions of the first lever 116 and the second lever 118 when the seat assembly 100 is in the first position 200. For example, the first lever 116 is positioned such that the shaft 130 of the motor 120 is engaged with the first circumferential end 144 of the first lever, the second lever 118 is generally upright, the first seat bottom lever 310 is generally upright with the first end 310A at a forwardmost position of the opening 322.

Figure 7B:
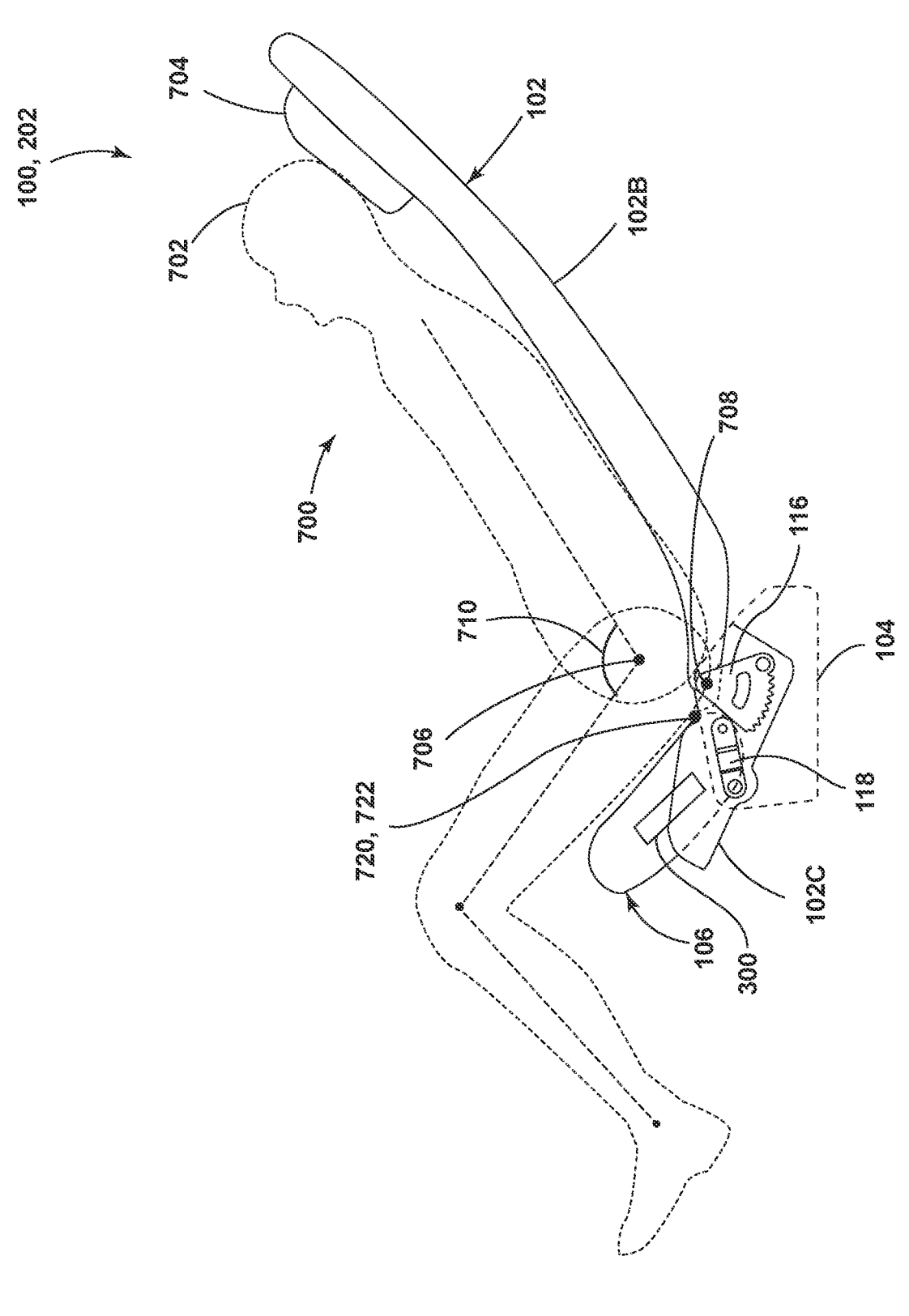

As illustrated in FIGS. 6B and 7B, the second seat position 202 is a reclined position with the seat back 102 rotated rearward (e.g., approximately thirty to thirty-five degrees, or other amounts) from the position of the seat back 102 in the first seat position 200. The seat bottom adjuster 300 permits the seat bottom 106 to pivot with the seat back 102, relative to the seat back 102, and/or relative to the seat base 104. For example, in some configurations, the seat bottom adjuster 300 may maintain the position of the seat bottom 106 relative to the seat back 102 by rotating with seat back 102 as the seat back 102 moves to or toward the first position 200 and the second position 202 (see, e.g., FIG. 6B). Maintaining the relative position of the seat bottom 106 may include the motor assembly 350 of the seat bottom adjuster 300 not operating and/or maintaining the position of the first ends 310A, 312A of the seat bottom levers 310, 312 relative to the openings 322, 332.

Figure 6C:
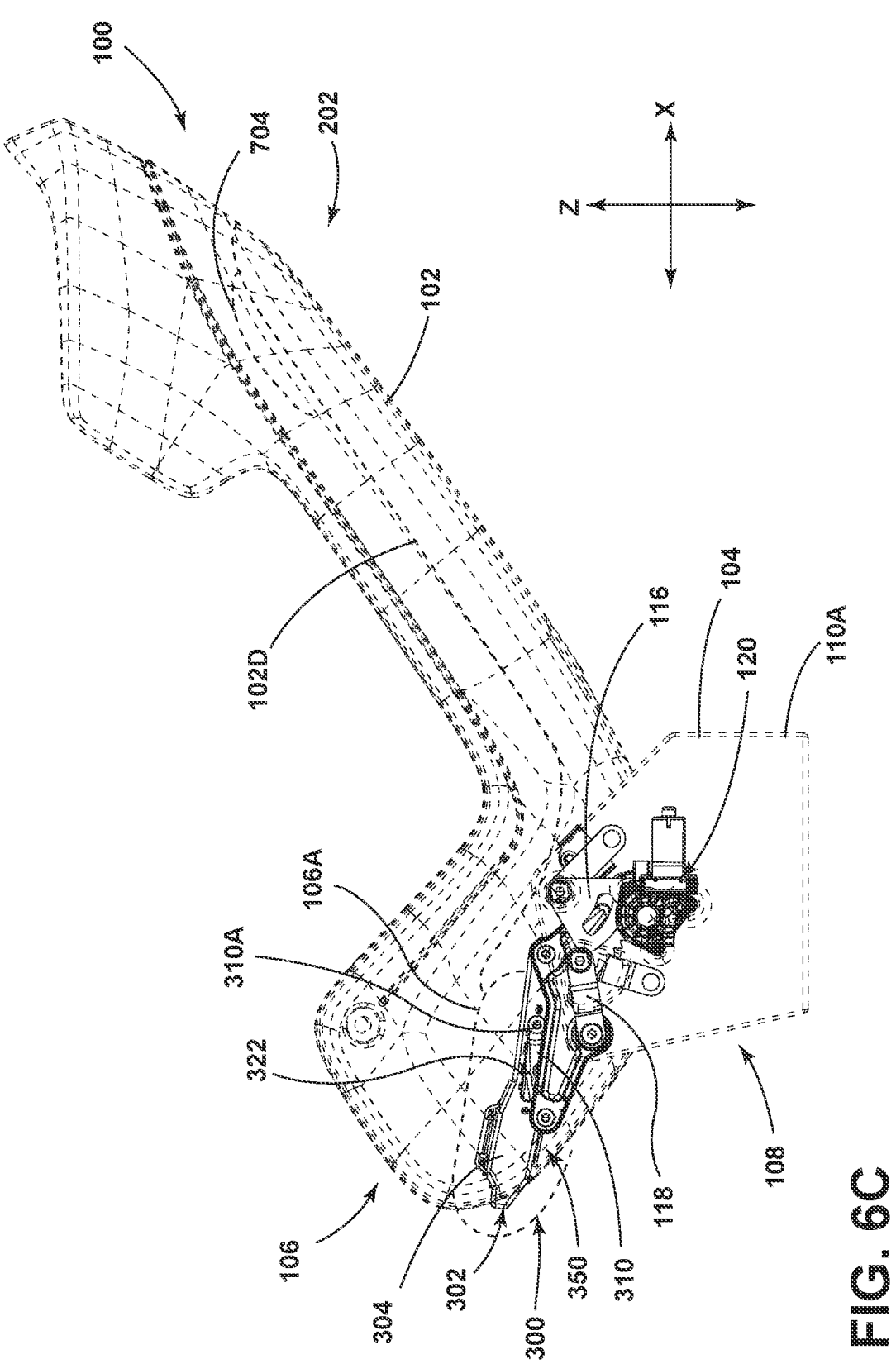
FIG. 6C is a side view generally illustrating an embodiment of a seat assembly in a second position with an adjusted seat bottom according to teachings of the present disclosure.

In other configurations, the motor assembly 350 may be actuated while the seat back 102 is moving relative to the seat base 104, which may cause the seat bottom 106 to move relative to the seat back 102 and/or the seat base 104 (see, e.g., FIG. 6C). For example, the motor assembly 350 may be actuated to move the first ends 310A, 312A of the seat bottom levers 310, 312 toward the rear of the openings 322, 332 while the seat back 102 is reclining, which may cause the seat bottom 106 to rotate forward (e.g., the seat back 102 and the seat bottom 106 may rotate/tilt in opposite directions at the same time). In some instances, the seat bottom adjuster 300 may be operated when the seat back 102 is not moving, such as to adjust the position/angle of the seat bottom 106 relative to the seat back 102 and the seat base 104.

Referring to FIG. 7A, an occupant 700 may sit on a seat bottom 106 with their back positioned against a seat back 102 and their head 702 positioned on a headrest 704. A hip point 706 of the occupant 700 may be located approximately where the occupant's spine and pelvis intersect, and/or where the occupant's back pivots from as the occupant 700 reclines. In a first seat position 200, an expected position (e.g., the expected position of an occupant of average size) of the occupant's hip point 706 is at or above (e.g., the same or a greater height than) an axis of rotation 708 of the seat back 102, and generally aligned with the axis of rotation 708 in the X-direction. For example and without limitation, the axis of rotation 708 and the hip point 706 may be offset in the X-direction by about 100 mm or less, or about 50 mm or less, which include offsets of 0 mm (e.g., no offset). Maintaining such small offsets may limit adverse effects to the occupant's body. In some configurations, the axis of rotation 708 is located at a height lower than some, most, or all of the seat bottom 106, lower than a bottom of the seat back cushion 102D, and greater/higher than the motor 120.

Referring to FIG. 7B, in the second seat position 202, the seat base 104 and the seat back 102 are disposed such that the hip point 706 is positioned at or above the axis of rotation 708 of the seat back 102. The hip point 706 may move to some degree relative to the axis of rotation 708 of the seat back 102, but may still be generally aligned with the axis of rotation 708 in the X-direction. The angle 710 of the occupant's torso to legs may be substantially the same in the first and second positions 200, 202 (e.g., if the seat cushion adjustment assembly 300 is not actuated). The occupant's head 702 may remain in the same position relative to the headrest 704 in the first seat position 200 as it is in the second seat position 202. The position of the axis of rotation 708 below and/or generally aligned with (e.g., in the X-direction) the hip point 706 may reduce and/or minimize pressure on occupant's spine, reduce and/or minimize bending in the occupant's spine, and reduce and/or minimize movement of an occupant's head relative to a headrest 704 associated with the seat assembly 100 and/or movement of the seat back 102. The occupant's back and hips may move together with the seat back 102.

As shown in FIGS. 7A and 7B, in some embodiments, an intersection of the occupant's thigh and buttocks 720 and the transition 722 between the seat back cushion 102D and the seat bottom 106 are substantially aligned with each other. Such a transition 722 is farther forward than other designs. For example, the transition 722 may be forward of the hip point 706. Such a configuration may provide improved and/or more consistent support for the pelvis of the occupant 700, which can improve posture and/or limit bone movement. In some configurations, the seat bottom 106 may be moved/tilted via the seat cushion adjustment assembly 300 without significant or any bending of the occupant's spine, with only the occupant's glutes possibly being squeezed or stretched. The transition 722 may comprise a gap between the seat back cushion 102D and the seat bottom 106, and/or may include at least some degree of interference/contact in at least some relative positions of the seat back cushion 102D and the seat bottom 106.

Figure 9A:
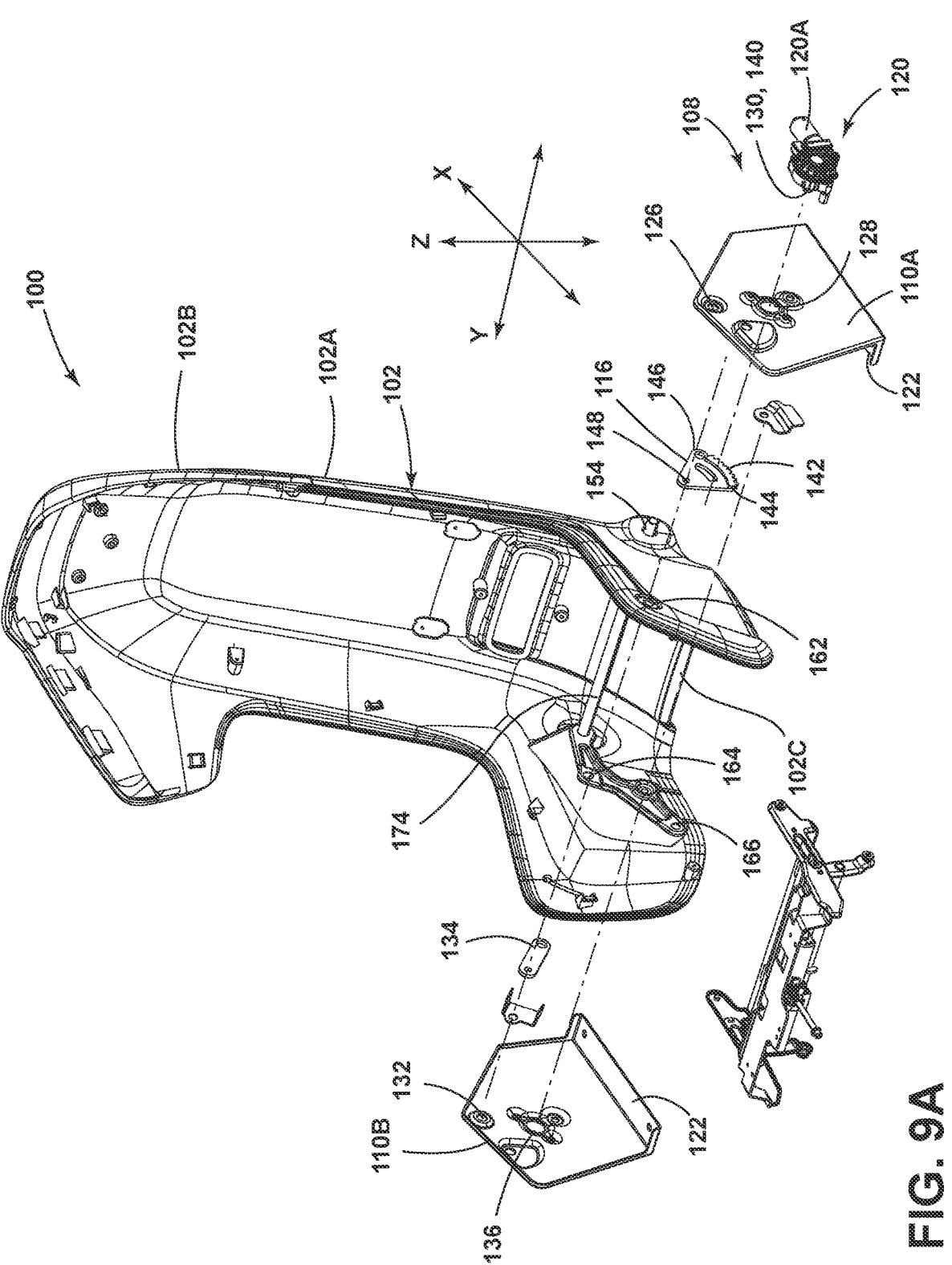
FIG. 9A is an exploded view generally illustrating an embodiment of a seat assembly according to teachings of the present disclosure.
Figure 9B:
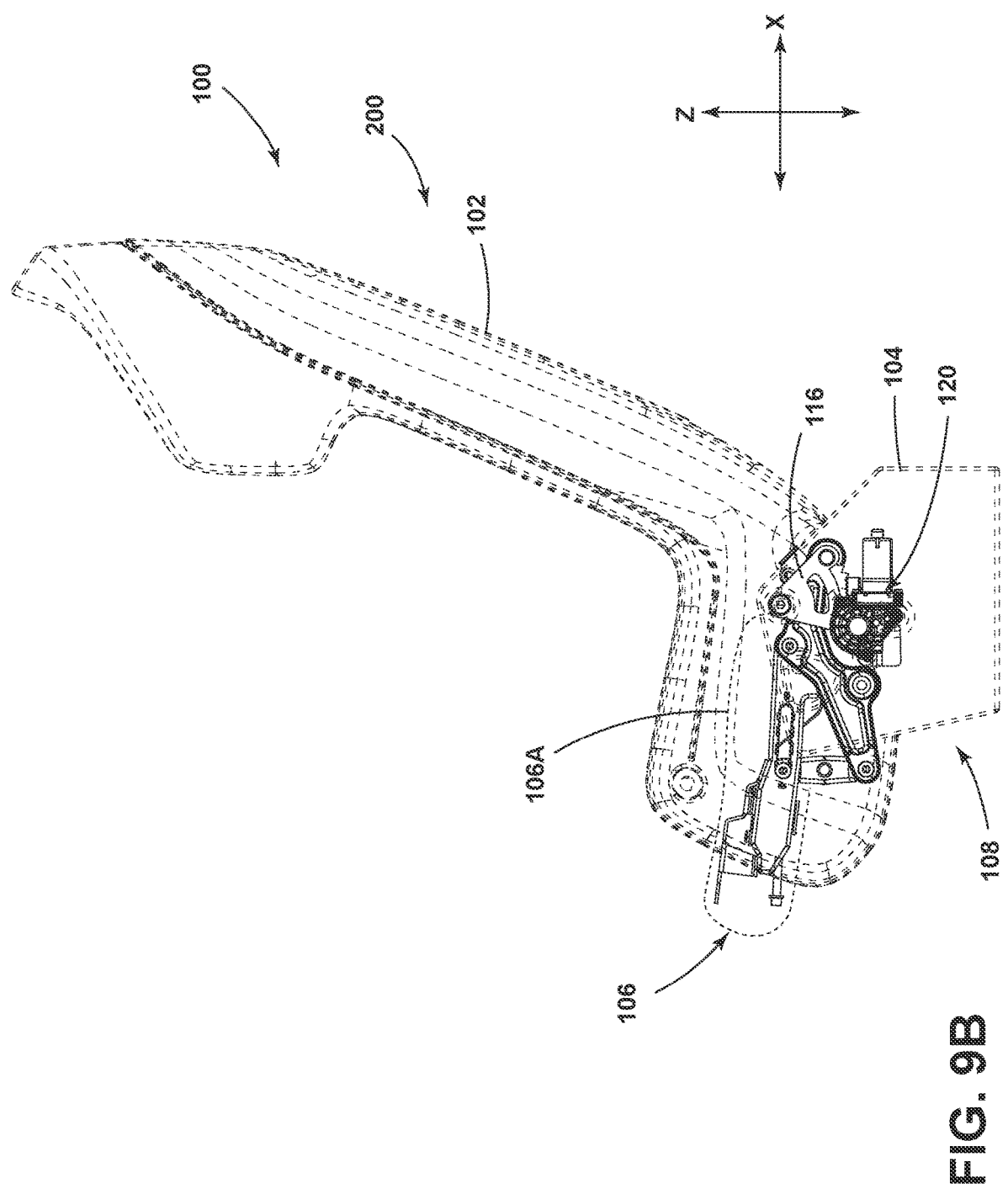
FIGS. 9B and 9C are side views generally illustrating an embodiment of a seat assembly in a first position and a second position, respectively, according to teachings of the present disclosure.
Figure 9C:
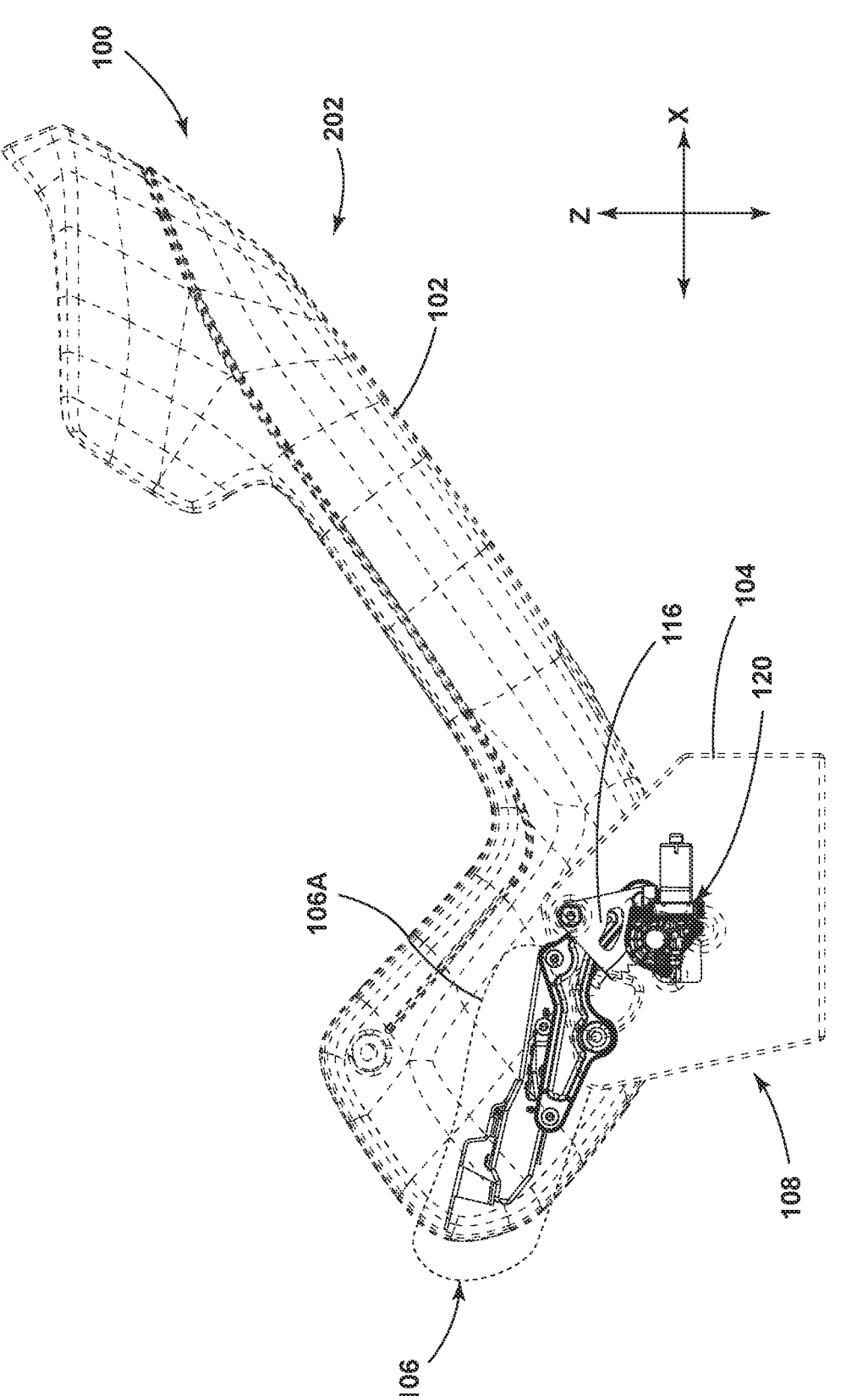

Referring to FIGS. 9A-9C, a seat assembly 100 is illustrated with another configuration of an adjustment assembly 108. The adjustment assembly 108 includes a cross member 174 (e.g., a tube, a shaft, etc.). The top section 148 of the first lever 116 is fixed (e.g., welded) to the cross member 174 such that the first lever 116 and the cross member 174 rotate together. The cross member 174 is also fixed (e.g., welded) to the seat back frame lower portion 102C such that the first lever 116, the cross member 174, and the seat back frame 102A rotate together. The motor 120 is coupled to the first lever 116 to control rotation of the seat back 102.

Figure 10A:
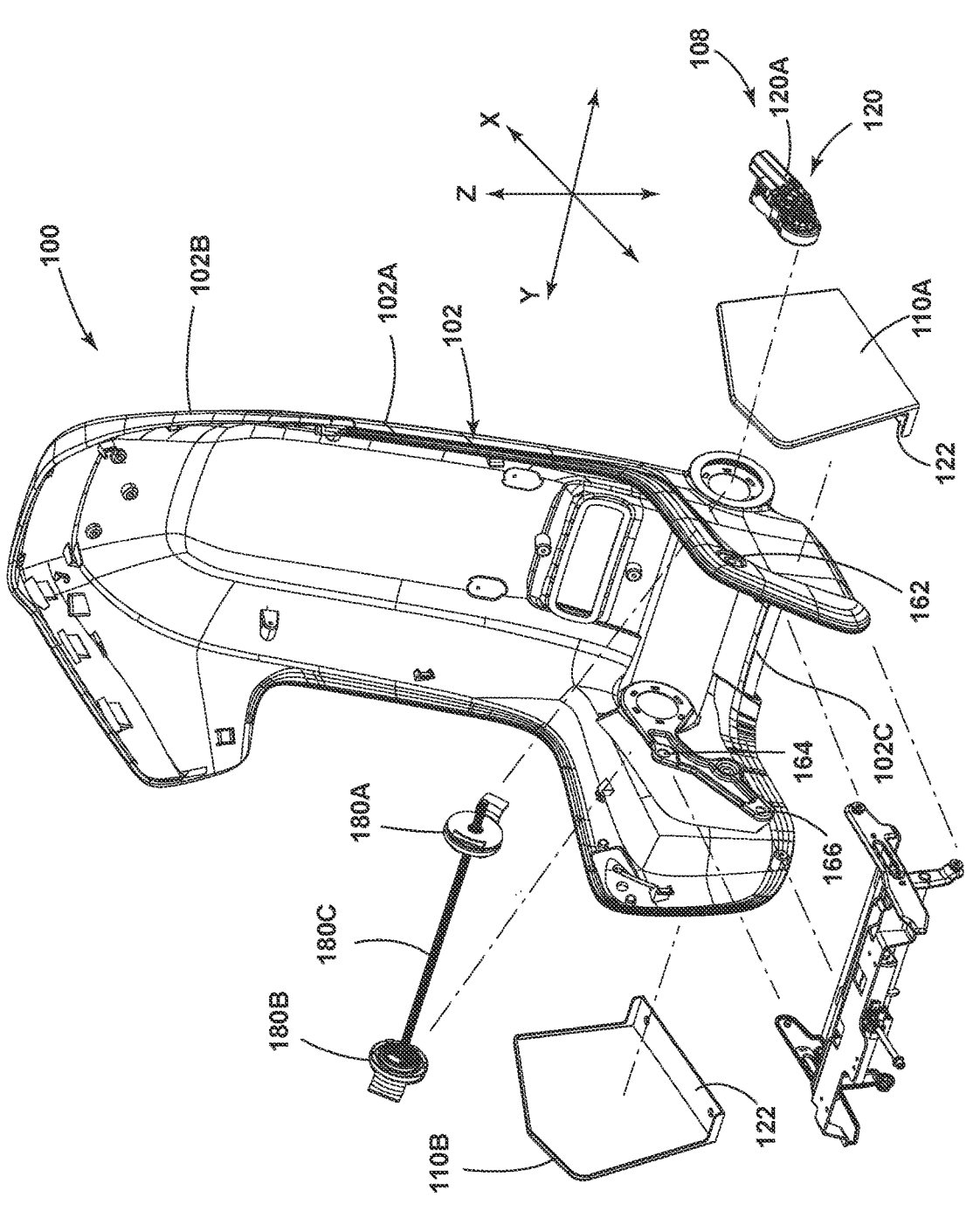
FIG. 10A is an exploded view generally illustrating an embodiment of a seat assembly according to teachings of the present disclosure.
Figure 10B:
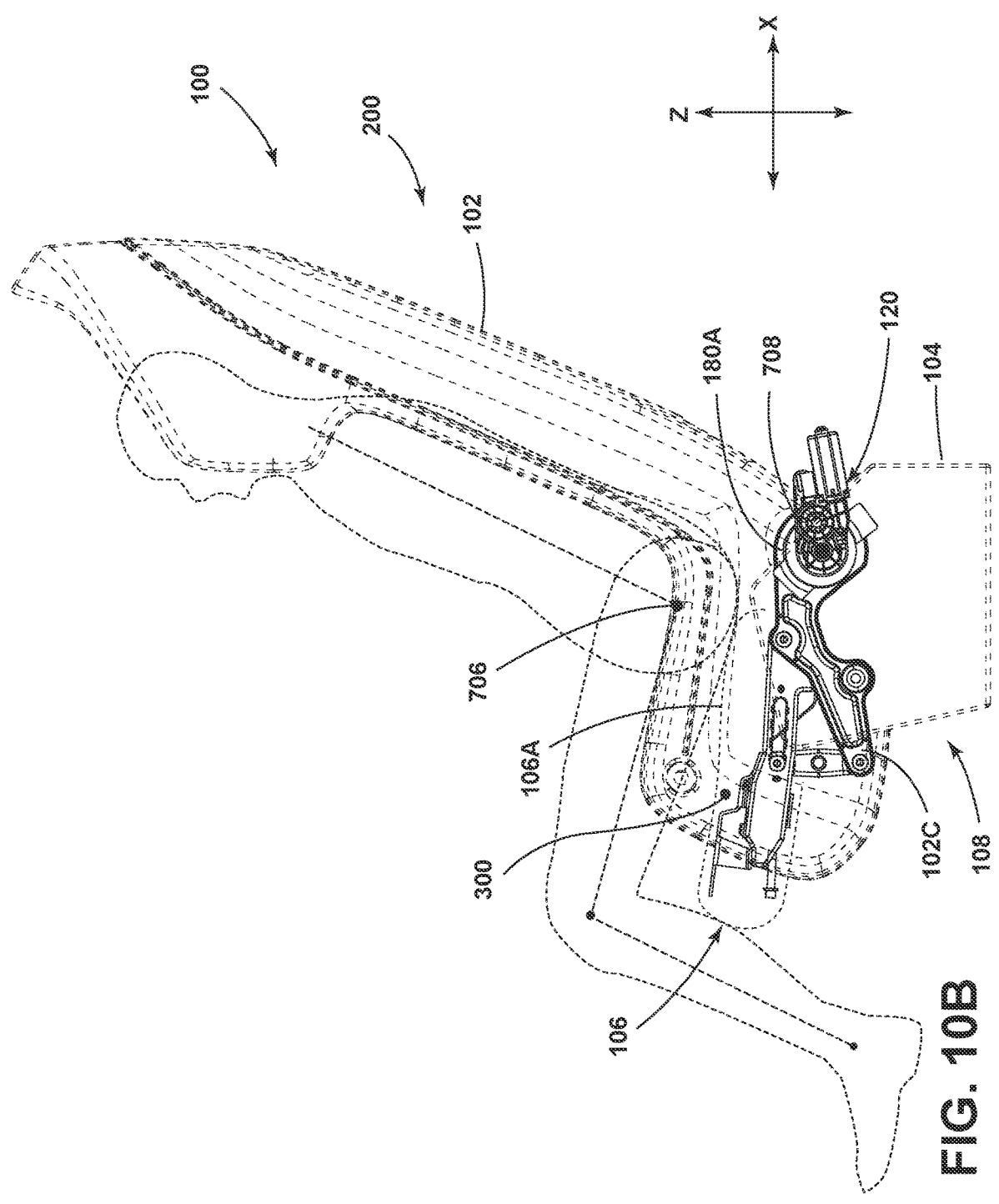
FIGS. 10B and 10C are side views generally illustrating an embodiment of a seat assembly in a first position and a second position, respectively, according to teachings of the present disclosure.
Figure 10C:
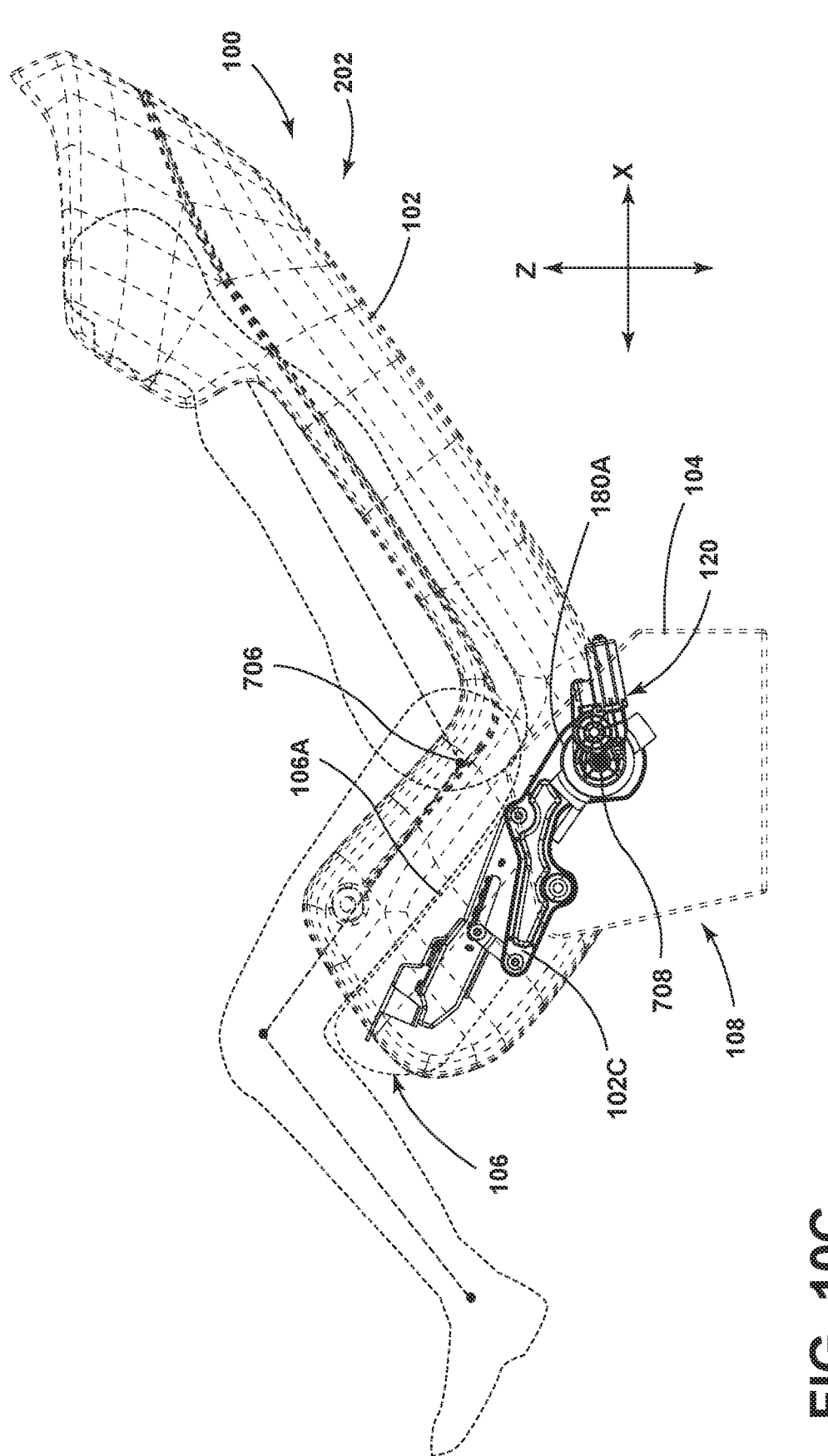

Referring to FIGS. 10A-10C, a seat assembly 100 is illustrated without levers 116, 118, 134, 138. Instead, the motor 120 is coupled to a first recliner 180A, which is coupled to a second recliner 180B via a synchronization shaft 180C. The recliners 180A-B are coupled to opposite sides of the lower portion 102C of the seat back frame 102A such that rotation of the motor 120 causes rotation of the seat back 102. The axis of rotation 708 of the seat back 102 is disposed below a height of the hip point 706.

With some embodiments, the seat bottom 106 is not directly connected to the seat base 104 and/or is indirectly connected to the seat base 104 via the seat bottom adjuster 300 and the seat back frame 102A.

In some embodiments, a bottom of a cushion 102D of the seat back 102 may be at a greater height than the motor 120. The bottom of the cushion 102D may, in some examples, be disposed above a height of an axis of rotation 708 of the seat back 102.

This disclosure includes, without limitation, the following embodiments:

1. A seat assembly, comprising: a seat base; a seat bottom connected to the seat base; a seat back pivotably connected to the seat base; and an adjustment assembly connected to the seat base, the adjustment assembly including: a first lever connected to the seat back, a second lever pivotably connected to the seat base and the seat back, and a motor coupled to the first lever; wherein actuation of the motor rotates the first lever to adjust the seat back to a first seat position and to a second seat position.

2. The seat assembly according to embodiment 1, wherein the seat back and the first lever are connected such that rotation of the first lever causes rotation of the seat back.

3. The seat assembly according to any preceding embodiment, wherein the seat bottom is pivotably connected to the seat base via the seat back.

4. The seat assembly according to any preceding embodiment including a seat bottom adjuster that includes (i) a seat bottom frame connected to the seat bottom and (ii) a seat bottom lever pivotably connected to the seat back and the seat bottom frame.

5. The seat assembly according to any preceding embodiment, wherein the seat bottom adjuster includes a seat bottom motor connected to the seat bottom frame; the seat bottom adjuster includes a transverse lever support connected to the seat bottom motor and the seat bottom lever; and the seat bottom motor is connected to the transverse lever support such that actuation of the seat bottom motor causes movement of the seat bottom lever and tilting of the seat bottom relative to the seat back.

6. The seat assembly according to any preceding embodiment, wherein a seat bottom bracket of the seat bottom frame includes an opening; and a first end of the seat bottom lever slides in the opening as the seat bottom tilts relative to the seat back.

7. The seat assembly according to any preceding embodiment, wherein, in the second seat position, the seat base and the seat back are disposed such that a hip point of an occupant is disposed at a height greater than a height of an axis of rotation of the seat back.

8. The seat assembly according to any preceding embodiment, wherein the axis of rotation of the seat back is offset from an expected hip point in a longitudinal direction by 100 mm or less in the first seat position and the second seat position.

9. The seat assembly according to any preceding embodiment, wherein the axis of rotation of the seat back is offset from an expected hip point in a longitudinal direction by 50 mm or less in the first seat position and the second seat position.

10. The seat assembly according to any preceding embodiment, including a headrest of the seat back; wherein a position of a head of the occupant relative to the headrest of the seat back is the same when the seat back is in the first seat position and in the second seat position.

11. The seat assembly according to any preceding embodiment, wherein a transition between (i) a seat back cushion of the seat back and (ii) the seat bottom is aligned with an expected intersection of a buttocks and a thigh of an occupant of the seat assembly.

12. The seat assembly according to any preceding embodiment, wherein: the seat back moves from a design position to a reclined position about an axis of rotation; and the axis of rotation is positioned below the seat bottom.

13. The seat assembly according to any preceding embodiment, including a bracket connected to a vehicle, wherein: the seat base includes the bracket; and the bracket connects the seat base and the seat back to the vehicle.

14. The seat assembly according to any preceding embodiment, wherein: the seat back includes a seat back frame; the seat back frame includes an upper portion and a lower portion; and the lower portion extends underneath the seat bottom such that the lower portion and the seat bottom overlap in a vertical direction and/or a lateral direction.

15. The seat assembly according to any preceding embodiment, wherein a length of overlap between the lower portion and the seat bottom is at least 25% of a length of the seat bottom.

16. The seat assembly according to any preceding embodiment, wherein the first lever includes a sector gear including a plurality of teeth; and the plurality of teeth are engaged with a gear of the motor.

17. The seat assembly according to any preceding embodiment, wherein the motor includes a shaft; the shaft extends through the seat base; the gear is connected to the shaft at an inner side of the seat base; and a body of the motor is disposed at an outer side of the seat base.

18. The seat assembly according to any preceding embodiment, wherein an axis of rotation of the seat back is aligned in a longitudinal direction with an expected hip point of an occupant of the seat assembly in the first seat position and the second seat position.

19. The seat assembly according to any preceding embodiment, wherein: the seat base includes a first bracket and a second bracket disposed at opposite sides of the seat assembly; the first lever and the second lever are pivotably connected to the first bracket; and the adjustment assembly includes a third lever and a fourth lever that are pivotably connected to the seat back and the second bracket.

20. The seat assembly according to any preceding embodiment, wherein the adjustment assembly does not include a synchronization lever or a second motor for rotating the seat back.

21. The seat assembly according to any preceding embodiment, wherein the seat back includes a cushion; and a bottom of the cushion is disposed at a height greater than the motor.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or nonfunctional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first element could be termed a second element, and, similarly, a second element could be termed a first element, without departing from the scope of the various described embodiments. The first element and the second element are both element, but they are not the same element.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including." "comprises," and/or "comprising." when used in this specification, specify the presence of stated features, integers, steps, operations, elements, and/or components, but do not preclude the presence or addition of one or more other features, integers, steps, operations, elements, components, and/or groups thereof.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. Uses of "e.g." and "such as" in the specification are to be construed broadly and are used to provide non-limiting examples of embodiments of the disclosure, and the disclosure is not limited to such examples.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

All matter contained in the above description or shown in the accompanying drawings shall be interpreted as illustrative only and not limiting. Changes in detail or structure may be made without departing from the present disclosure.

What is claimed is:

1. A seat assembly, comprising:
a seat base;
a seat bottom connected to the seat base;
a seat back pivotably connected to the seat base and the seat bottom is pivotably connected to the seat base via the seat back; and
an adjustment assembly connected to the seat base, the adjustment assembly comprising:
a first lever connected to the seat back;
a second lever pivotably connected to the seat base and the seat back; and
a motor coupled to the first lever, wherein actuation of the motor rotates the first lever to adjust the seat back to a first seat position and to a second seat position.

2. The seat assembly of claim 1, wherein the seat back and the first lever are connected such that rotation of the first lever causes rotation of the seat back.

3. The seat assembly of claim 1, comprising a bracket connected to a vehicle; wherein:
the seat base comprises the bracket; and
the bracket connects the seat base and the seat back to the vehicle.

4. The seat assembly of claim 1, comprising a seat bottom adjuster that comprises (i) a seat bottom frame connected to the seat bottom and (ii) a seat bottom lever pivotably connected to the seat back and the seat bottom frame.

5. The seat assembly of claim 4, wherein the seat bottom adjuster comprises a seat bottom motor connected to the seat bottom frame;
the seat bottom adjuster comprises a transverse lever support connected to the seat bottom motor and the seat bottom lever; and
the seat bottom motor is connected to the transverse lever support such that actuation of the seat bottom motor causes movement of the seat bottom lever and tilting of the seat bottom relative to the seat back.

6. The seat assembly of claim 5, wherein a seat bottom bracket of the seat bottom frame comprises an opening; and

a first end of the seat bottom lever slides in the opening as the seat bottom tilts relative to the seat back.

7. The seat assembly of claim 1, wherein:
the seat back comprises a seat back frame;
the seat back frame comprises an upper portion and a lower portion; and
the lower portion extends underneath the seat bottom such that the lower portion and the seat bottom overlap in a vertical direction.

8. The seat assembly of claim 7, wherein a length of overlap between the lower portion and the seat bottom is at least 25% of a length of the seat bottom.

9. The seat assembly of claim 1, wherein the first lever comprises a sector gear comprising a plurality of teeth; and
the plurality of teeth are engaged with a gear of the motor.

10. The seat assembly of claim 9, wherein the motor comprises a shaft;
the shaft extends through the seat base;
the gear is connected to the shaft at an inner side of the seat base; and
a body of the motor is disposed at an outer side of the seat base.

11. The seat assembly of claim 1, wherein an axis of rotation of the seat back is aligned in a longitudinal direction with an expected hip point of an occupant of the seat assembly in the first seat position and the second seat position.

12. The seat assembly of claim 1, wherein:
the seat base comprises a first bracket and a second bracket disposed at opposite sides of the seat assembly;
the first lever and the second lever are pivotably connected to the first bracket; and
the adjustment assembly comprises a third lever and a fourth lever that are pivotably connected to the seat back and the second bracket.

13. The seat assembly of claim 1, wherein the adjustment assembly does not comprise a synchronization lever or a second motor for rotating the seat back.

14

14. A seat assembly, comprising:
a seat base;
a seat bottom connected to the seat base;
a seat back pivotably connected to the seat base, wherein the seat bottom is pivotably connected to the seat base via the seat back; and
an adjustment assembly connected to the seat base, the adjustment assembly comprising:
a first lever connected to the seat back;
a second lever pivotably connected to the seat base and the seat back; and
a motor coupled to the first lever,
wherein actuation of the motor rotates the first lever to adjust the seat back to a first seat position in which a first circumferential end of the first lever is engaged with a shaft of the motor and to adjust the seat back to a second seat position in which a second circumferential end of the first lever is engaged with the shaft of the motor.

15. The seat assembly of claim 14, wherein the seat back and the first lever are connected such that rotation of the first lever causes rotation of the seat back.

16. The seat assembly of claim 14, comprising a seat bottom adjuster that comprises (i) a seat bottom frame connected to the seat bottom and (ii) a seat bottom lever pivotably connected to the seat back and the seat bottom frame.

17. The seat assembly of claim 14, comprising a bracket connected to a vehicle; wherein:
the seat base comprises the bracket; and
the bracket connects the seat base and the seat back to the vehicle.

18. The seat assembly of claim 14, wherein:
the seat back comprises a seat back frame;
the seat back frame comprises an upper portion and a lower portion; and
the lower portion extends underneath the seat bottom such that the lower portion and the seat bottom overlap in a vertical direction.

* * * * *